(12) United States Patent
Spehar et al.

(10) Patent No.: US 12,091,094 B2
(45) Date of Patent: Sep. 17, 2024

(54) VEHICLE FRAME RAILS AND METHODS OF ASSEMBLING VEHICLE FRAME RAILS

(71) Applicant: AM GENERAL LLC, South Bend, IN (US)

(72) Inventors: Jeffrey R. Spehar, Northville, MI (US); Hariton N. Poparad, Farmington Hills, MI (US); Mark Cutshall, Brighton, MI (US); John T. McNally, Berkley, MI (US)

(73) Assignee: AM General LLC, South Bend, IN (US)

( * ) Notice: Subject to any disclaimer, the term of this patent is extended or adjusted under 35 U.S.C. 154(b) by 0 days.

(21) Appl. No.: 18/135,949

(22) Filed: Apr. 18, 2023

(65) Prior Publication Data

US 2023/0249757 A1    Aug. 10, 2023

Related U.S. Application Data

(63) Continuation of application No. 17/128,280, filed on Dec. 21, 2020, now Pat. No. 11,654,975.

(51) Int. Cl.
     *B62D 27/02*      (2006.01)
     *B62D 21/02*      (2006.01)
     *B62D 65/02*      (2006.01)

(52) U.S. Cl.
     CPC ........... *B62D 27/023* (2013.01); *B62D 21/02* (2013.01); *B62D 65/02* (2013.01)

(58) Field of Classification Search
     CPC ...... B62D 21/02; B62D 21/09; B62D 27/023; B62D 65/02
     USPC .................. 296/203.01, 2, 3, 4, 204
     See application file for complete search history.

(56) References Cited

U.S. PATENT DOCUMENTS

| | | | |
|---|---|---|---|
| 1,191,729 A | 7/1916 | Pool | |
| 1,215,965 A | 2/1917 | Murray | |
| 1,491,563 A | 4/1924 | Stresau | |
| 1,835,243 A | 12/1931 | Schaffert | |

(Continued)

FOREIGN PATENT DOCUMENTS

| | | |
|---|---|---|
| DE | 3317808 A1 | 11/1984 |
| DE | 3317808 C2 | 9/1991 |

(Continued)

OTHER PUBLICATIONS

Representation of prior art vehicle frame rail, undated, 1 page.

(Continued)

*Primary Examiner* — Dennis H Pedder
(74) *Attorney, Agent, or Firm* — Barnes & Thornburg LLP

(57) ABSTRACT

A vehicle frame rail includes a first half having a hole, a second half having a hole, a spacer locating member and a spacer. The second half is connected to the first half such that the hole in the first half is aligned with the hole in the second half and so as to form an enclosed space between the first half and the second half. The spacer locating member has a body section and a hole. The body section of the spacer locating member is spaced apart from the first half and the second half. The spacer has a first end, a second end and a bore extending from the first end to the second end. The spacer is located in the hole of the spacer locating member such that the bore is aligned with the hole in the first half and the hole in the second half.

45 Claims, 17 Drawing Sheets

(56) References Cited

U.S. PATENT DOCUMENTS

| | | | |
|---|---|---|---|
| 2,001,846 A | 5/1935 | Ledwinka |
| 2,051,216 A | 8/1936 | Jones et al. |
| 2,060,970 A | 11/1936 | Belden |
| 2,113,399 A | 4/1938 | Dietrich |
| 2,113,403 A | 4/1938 | Harmon |
| 2,327,585 A | 8/1943 | Ulrich |
| 2,380,523 A | 7/1945 | Hicks et al. |
| 2,467,516 A | 4/1949 | Almdale |
| 2,883,232 A | 4/1959 | Olley et al. |
| 3,344,370 A | 9/1967 | Sewell |
| 3,508,784 A | 4/1970 | Small |
| 4,011,786 A | 3/1977 | Liebig |
| 4,014,588 A | 3/1977 | Kohriyama |
| 4,135,757 A | 1/1979 | Smith et al. |
| 4,258,820 A | 3/1981 | Miura et al. |
| 4,271,921 A | 6/1981 | Ochsner |
| 4,283,898 A | 8/1981 | Claver |
| 4,453,763 A | 6/1984 | Richards |
| 4,604,013 A | 8/1986 | Elwell et al. |
| 4,819,980 A | 4/1989 | Sakata et al. |
| 4,863,214 A | 9/1989 | Kranis, Jr. |
| 4,916,793 A | 4/1990 | Kuhn |
| 4,934,861 A | 6/1990 | Weeks et al. |
| 5,061,528 A | 10/1991 | Ruehl |
| 5,061,529 A | 10/1991 | Ruehl |
| 5,139,361 A | 8/1992 | Camuffo |
| 5,149,132 A | 9/1992 | Ruehl et al. |
| 5,152,840 A | 10/1992 | Ruehl |
| 5,176,417 A | 1/1993 | Bauer |
| 5,194,302 A | 3/1993 | Ruehl |
| 5,259,660 A | 11/1993 | Haesters |
| 5,264,252 A | 11/1993 | Ruehl |
| 5,264,253 A | 11/1993 | Ruehl |
| 5,308,115 A | 5/1994 | Ruehl et al. |
| 5,487,219 A | 1/1996 | Ruehl et al. |
| 5,560,674 A | 10/1996 | Tazaki et al. |
| 5,573,222 A | 11/1996 | Ruehl et al. |
| 5,662,444 A | 9/1997 | Schmidt, Jr. |
| 5,682,678 A | 11/1997 | Gallagher et al. |
| 5,865,362 A | 2/1999 | Behrmann et al. |
| 5,980,174 A | 11/1999 | Gallagher et al. |
| 6,010,155 A | 1/2000 | Rinehart |
| 6,017,073 A | 1/2000 | Lindblom et al. |
| 6,138,357 A | 10/2000 | Jones |
| 6,186,696 B1 | 2/2001 | Valin |
| 6,189,285 B1 | 2/2001 | Mockry |
| 6,199,894 B1 | 3/2001 | Anderson |
| 6,205,736 B1 | 3/2001 | Amborn et al. |
| 6,216,763 B1 | 4/2001 | Ruehl et al. |
| 6,237,304 B1 | 5/2001 | Wycech |
| 6,299,210 B1 | 10/2001 | Ruehl et al. |
| 6,309,157 B1 | 10/2001 | Amann et al. |
| 6,394,537 B1 | 5/2002 | DeRees |
| 6,412,818 B1 * | 7/2002 | Marando ............... B62D 21/02 |
| | | | 280/798 |
| 6,543,828 B1 | 4/2003 | Gass |
| 6,585,468 B2 | 7/2003 | Johnson et al. |
| 6,688,826 B2 | 2/2004 | Agha et al. |
| 6,733,040 B1 | 5/2004 | Simboli |
| 6,769,851 B2 | 8/2004 | Agha et al. |
| 6,910,671 B1 | 6/2005 | Norkus et al. |
| 7,144,040 B2 | 12/2006 | Kiehl et al. |
| 7,201,398 B1 | 4/2007 | Christofaro et al. |
| 7,219,954 B2 | 5/2007 | Gomi et al. |
| 7,251,915 B2 * | 8/2007 | Zimmerman ........ B62D 29/001 |
| | | | 296/205 |
| 7,275,296 B2 | 10/2007 | DiCesare |
| 7,290,778 B2 | 11/2007 | Domin |
| 7,300,536 B1 | 11/2007 | Wang et al. |
| 7,393,015 B1 | 7/2008 | Gillespie et al. |
| 7,658,412 B2 | 2/2010 | Ramsey et al. |
| 8,246,061 B2 | 8/2012 | Kang |
| 8,484,930 B2 | 7/2013 | Ruehl |
| 8,485,555 B2 * | 7/2013 | Hunt ..................... B62D 21/02 |
| | | | 180/311 |
| 9,771,041 B2 | 9/2017 | Jaynes |
| 10,549,783 B2 | 2/2020 | Haselhorst et al. |
| 2001/0039712 A1 | 11/2001 | Ruehl et al. |
| 2002/0163173 A1 | 11/2002 | Ruehl et al. |
| 2003/0126730 A1 | 7/2003 | Barber et al. |
| 2003/0184075 A1 | 10/2003 | Freeman et al. |
| 2003/0194292 A1 | 10/2003 | Deeg et al. |
| 2005/0117997 A1 | 6/2005 | Pinzi |
| 2006/0091701 A1 | 5/2006 | DiCesare |
| 2006/0182519 A1 | 8/2006 | Welzel et al. |
| 2006/0193714 A1 | 8/2006 | Werner |
| 2006/0228194 A1 | 10/2006 | Nilsen et al. |
| 2007/0107368 A1 | 5/2007 | Ruehl |
| 2007/0176406 A1 | 8/2007 | Ruehl |
| 2008/0029330 A1 | 2/2008 | DiCesare |
| 2008/0072528 A1 | 3/2008 | Wolfe |
| 2019/0322321 A1 | 10/2019 | Schwartz et al. |

FOREIGN PATENT DOCUMENTS

| | | |
|---|---|---|
| DE | 19637243 A1 | 3/1998 |
| DE | 112014005658 T5 | 8/2016 |
| EP | 0841240 A2 | 5/1998 |
| EP | 1055829 A2 | 11/2000 |
| JP | 404011582 A | 1/1992 |
| WO | 2006045194 A1 | 5/2006 |
| WO | 2007090187 A2 | 8/2007 |
| WO | 2007090187 A3 | 8/2007 |

OTHER PUBLICATIONS

Information, photos and renderings of prior art re vehicle frame rails and components, undated 11 pages.

European Patent Office, International Search Report Issued in PCT/US2004/061452, Jul. 24, 2007, 3 pages.

European Patent Office, Communication Pursuant to Article 94(3) EPC in EP Application No. 07762899.8, Jun. 9, 2009, 3 pages.

European Patent Office, International Search Report Issued in related PCT Application No. PCT/US2021/064562, Mar. 28, 2022, 5 pages.

European Patent Office, Written Opinion Issued in related PCT Application No. PCT/US2021/064562, Mar. 28, 2022, 14 pages.

* cited by examiner

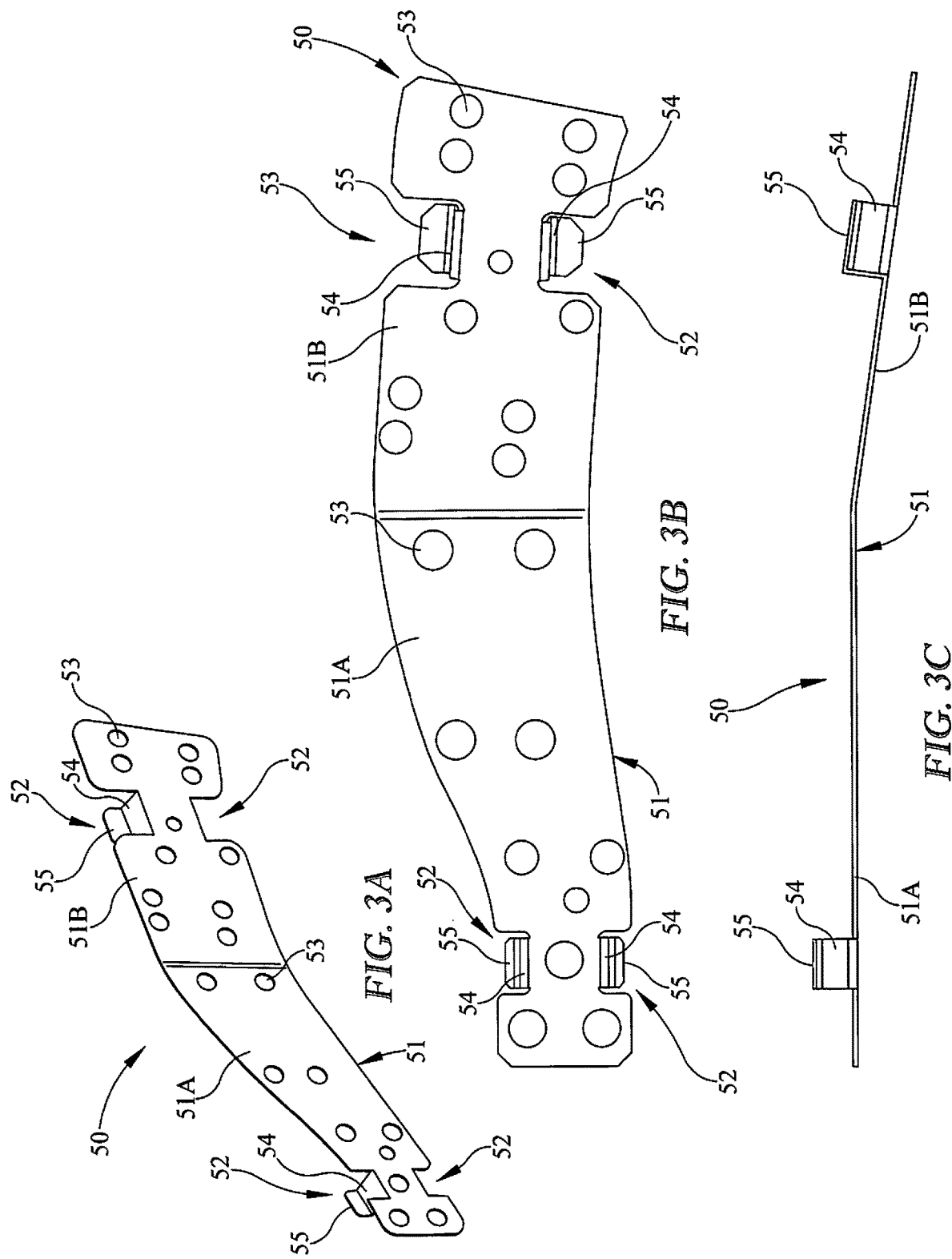

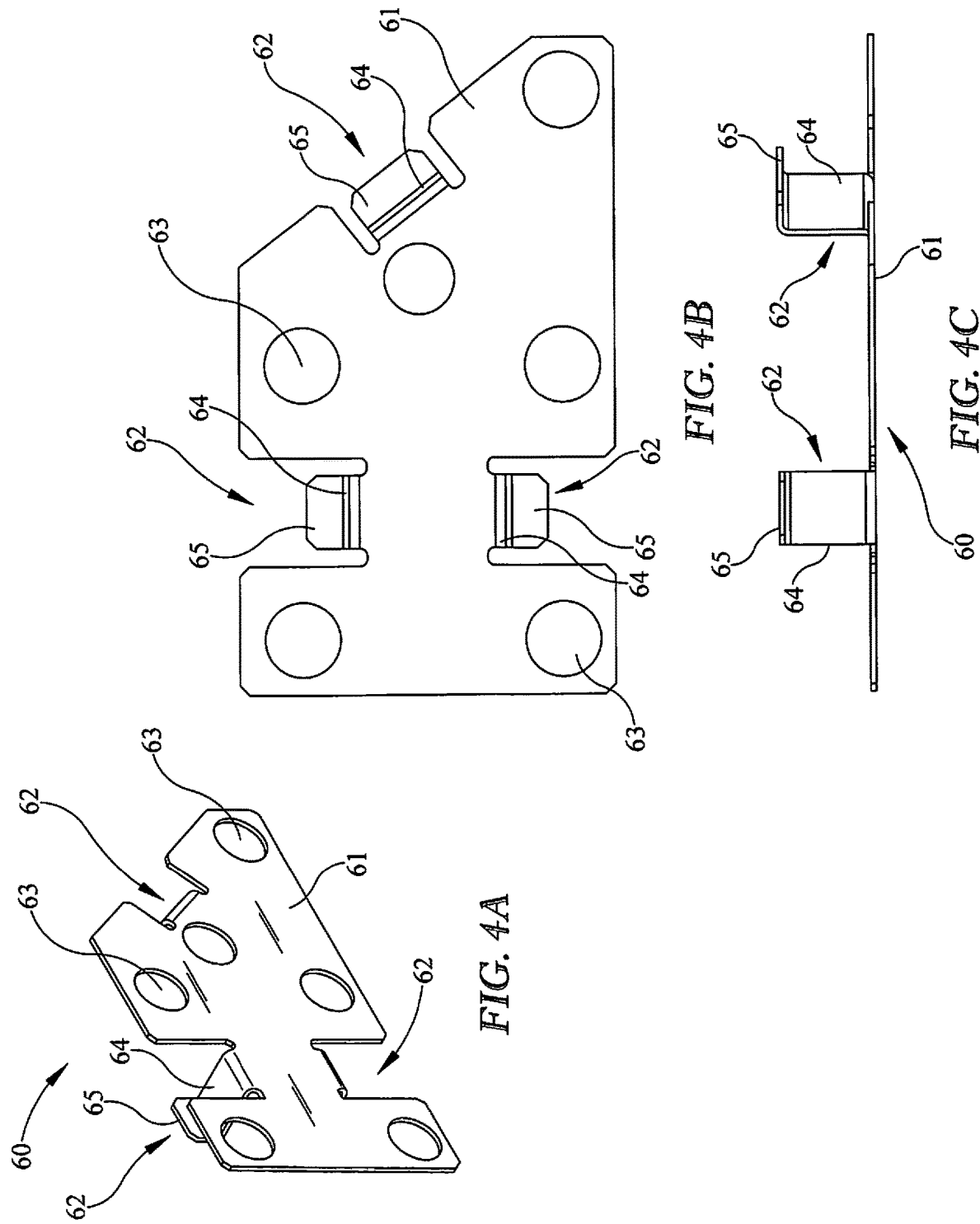

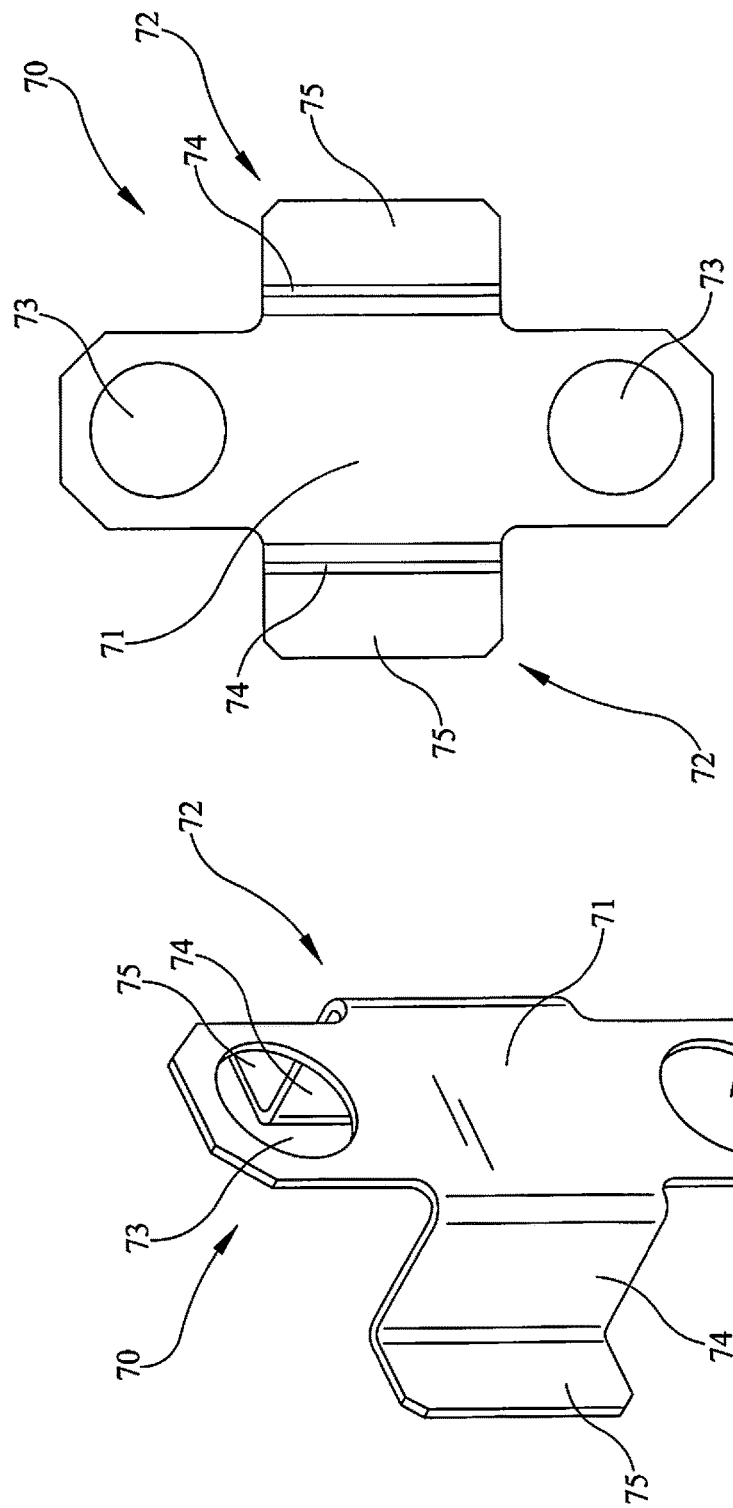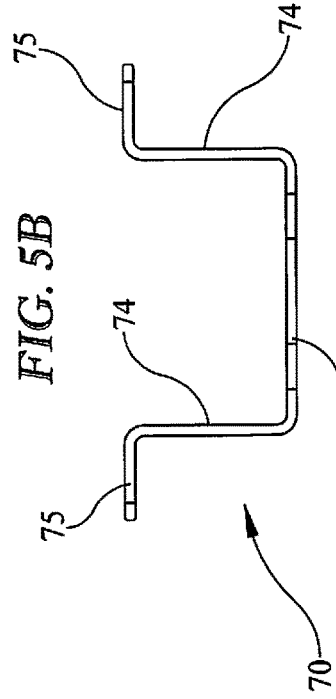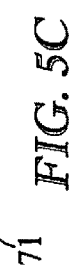

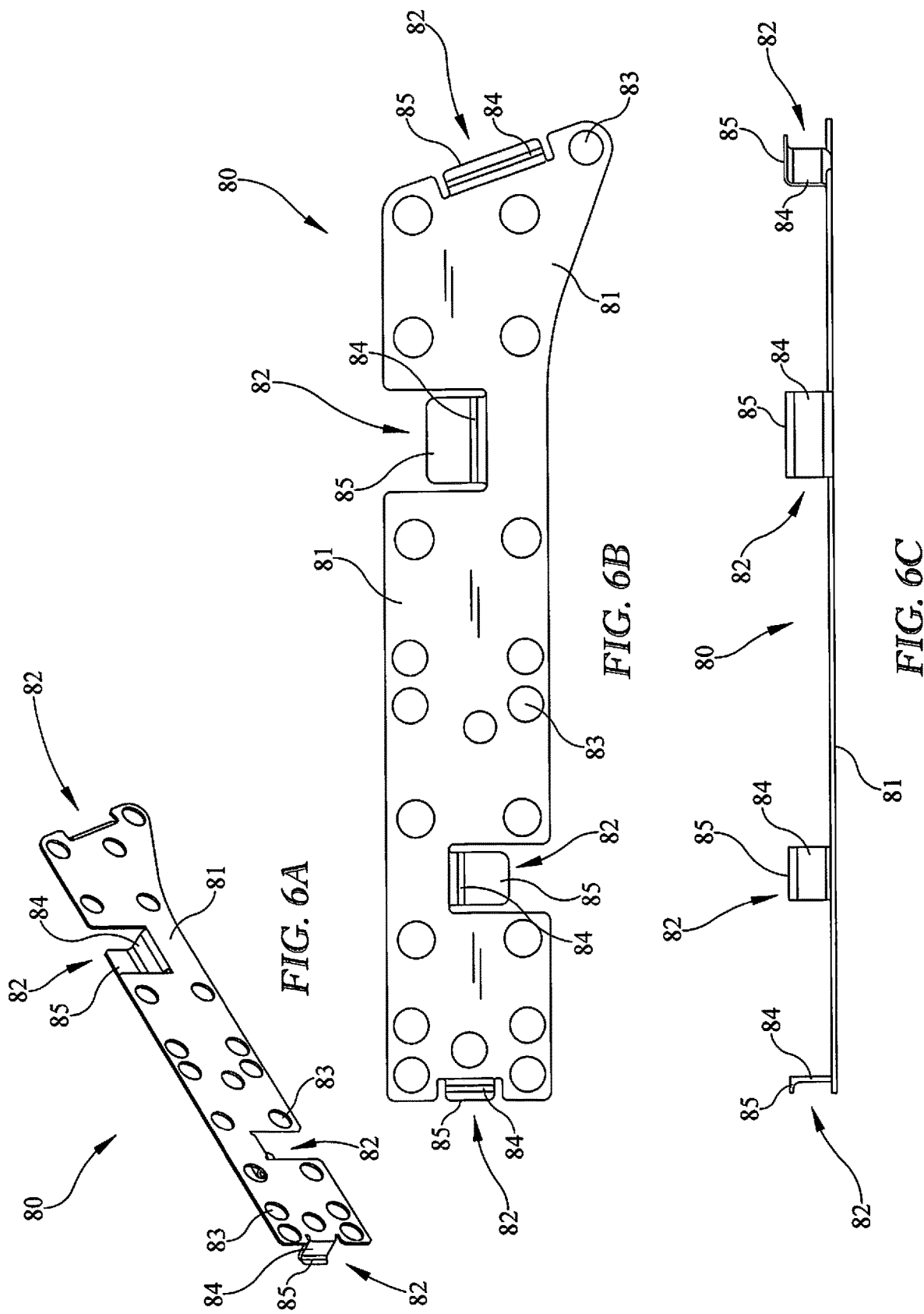

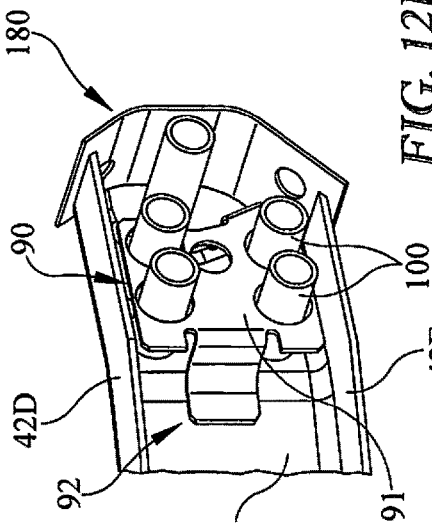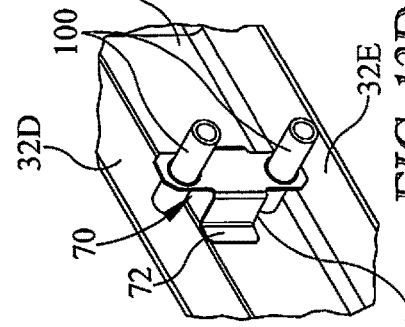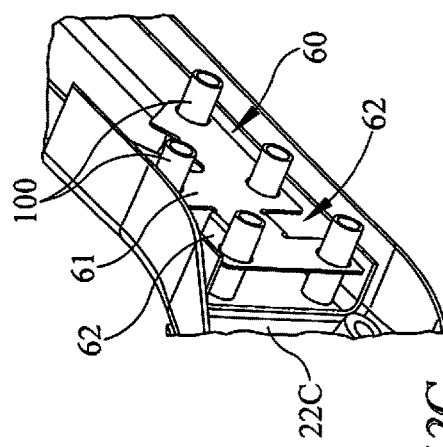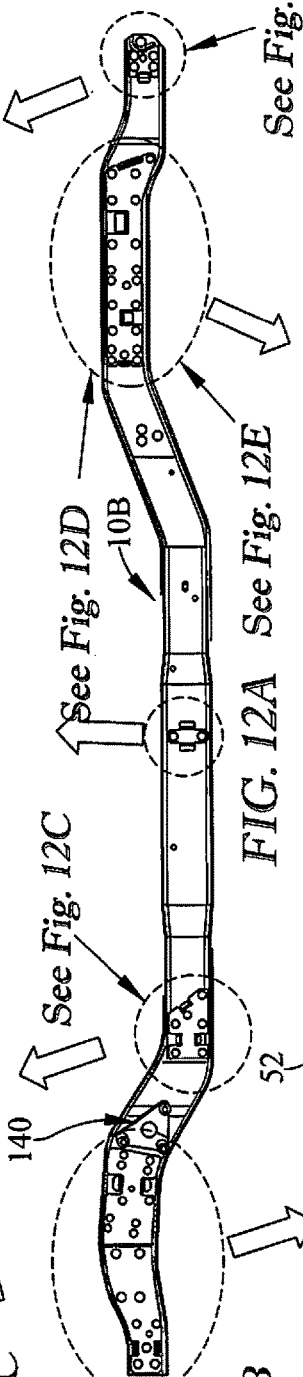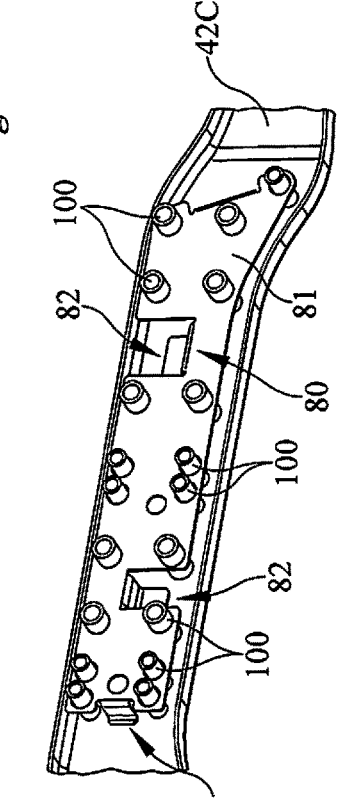

VEHICLE FRAME RAILS AND METHODS OF ASSEMBLING VEHICLE FRAME RAILS

This application is a continuation of and claims priority to U.S. patent application Ser. No. 17/128,280, filed Dec. 21, 2020, which is incorporated herein by reference in its entirety.

The present invention relates generally to the field of vehicle components. In particular, the present invention relates to vehicle frame rails and methods of assembling vehicle frame rails.

BACKGROUND OF THE INVENTION

A typical vehicle chassis includes a pair of frame rails that extend along the length of the vehicle on opposite sides. The frame rails are connected by one or more cross members. Various vehicle components, such as, for example, suspension components, may be connected, either directly or indirectly, to the frame rails.

U.S. Pat. No. 2,327,585 discloses use of a bolt spacer or reinforcing member in connection with a vehicle chassis. This patent discloses a structural member having three elements. The first element includes a channel member forming a first panel. The second element includes a second panel. The third element includes one or more sockets and is positioned between the first and second elements. The sockets receive reinforcing elements in the form of tubular spacers. The reinforcing elements include a longitudinal bore sized to receive a bolt. The bolt, in combination with a nut, holds the three elements together.

U.S. Pat. No. 4,863,214 discloses a spacer tube matrix. The spacer tube matrix is intended for use within a vehicle frame having a box beam construction. The spacer tube matrix aligns a plurality of spacer tubes with openings in the side walls of the box beam construction. Bolts may be inserted through the openings in the box beam construction and the spacer tubes.

U.S. Pat. No. 8,484,930 discloses a box frame member having two sections with one or more openings in each section. Locators are formed around each of the holes. The locators extend into opposite ends of spacers placed between the two sections.

SUMMARY OF THE INVENTION

In one embodiment of the present invention, a vehicle frame rail includes a first half, a second half, a spacer locating member and a spacer. The first half has a hole. The second half has a hole and is connected to the first half such that the hole in the first half is aligned with the hole in the second half and so as to form an enclosed space between the first half and the second half. The spacer locating member has a body section spaced apart from the first half and the second half, a hole, and a support member spaced apart from the first half and contacting the second half. The spacer has a first end, a second end and a bore extending from the first end to the second end. The spacer is located in the hole of the spacer locating member such that the bore is aligned with the hole in the first half and the hole in the second half.

In one embodiment, the spacer locating member is located within the enclosed space. In another embodiment, the body section of the spacer locating member is located between the first half and the second half.

In certain embodiments, the support member has a first section extending from the body section of the spacer locating member and a second section extending from the first section. In one embodiment, the first section of the support member is perpendicular to the body section of the spacer locating member. In another embodiment, the second section of the support member is perpendicular to the first section of the support member. In certain embodiments of the invention, the first section of the support member extends from an edge of the body section of the spacer locating member.

In one embodiment, the first half has a first flange and a second flange, the second half has a first flange and a second flange, and the first and second flanges of the second half are located between the first and second flanges of the first half.

In another embodiment, the vehicle frame rail has a front rail section, a center rail section and a rear rail section, the first half of the vehicle frame rail includes a first section of the front rail section, a first section of the center rail section and a first section of the rear rail section, and the second half of the vehicle frame rail includes a second section of the front rail section, a second section of the center rail section and a second section of the rear rail section. In one embodiment, the center rail section has a first end located between the first and second sections of the front rail section. In certain embodiments, the center rail section has a first end and a second end and the second end of the center rail section is located between the first and second sections of the rear rail section. In another embodiment, the center rail section has a first end located between the first and second sections of the front rail section and a second end located between the first and second sections of the rear rail section.

In other embodiments, the first half has a plurality of holes, the second half has a plurality of holes and at least two holes in the first half are aligned with at least two holes in the second half. In one embodiment, the spacer locating member includes a plurality of holes and at least two holes in the spacer locating member are aligned with at least two holes in the first half and with at least two holes in the second half.

In certain embodiments of the present invention, the vehicle frame rail further includes a reinforcing member having a hole and the reinforcing member is located in the enclosed space such that the hole in the reinforcing member is aligned with the hole in the first half and the hole in the second half. In other embodiments, the reinforcing member is located between the spacer locating member and the first half. In some embodiments, the hole in the reinforcing member is aligned with the hole in the spacer locating member. In other embodiments, the spacer is located in the hole in the reinforcing member.

In some embodiments, the body section of the spacer locating member has a planar section, the support member has a first section extending perpendicularly from the planar section and a second section extending parallel to the planar section, and the hole of the spacer locating member is located in the planar section In one embodiment of the present invention, a vehicle frame rail includes a first half, a second half, a spacer locating member and a spacer. The first half has a hole. The second half has a hole and is connected to the first half such that the hole in the first half is aligned with the hole in the second half and so as to form an enclosed space between the first half and the second half. The spacer locating member has a body section, a support member, and a hole. The body section of the spacer locating member has a planar section. The support member has a first section extending perpendicularly from the planar section and a second section extending parallel to the planar section. The hole of the spacer locating member is located in the planar section. The spacer has a first end, a second end and a bore extending from the first end to the second end. The spacer is located in the hole of the spacer locating member such that the bore is aligned with the hole in the first half and the hole in the second half.

In one embodiment, the spacer locating member is located within the enclosed space. In another embodiment, the body section of the spacer locating member is located between the first half and the second half.

In certain embodiments, the first section of the support member extends from an edge of the body section of the spacer locating member.

In one embodiment, the first half has a first flange and a second flange, the second half has a first flange and a second flange, and the first and second flanges of the second half are located between the first and second flanges of the first half.

In another embodiment, the vehicle frame rail has a front rail section, a center rail section and a rear rail section, the first half of the vehicle frame rail includes a first section of the front rail section, a first section of the center rail section and a first section of the rear rail section, and the second half of the vehicle frame rail includes a second section of the front rail section, a second section of the center rail section and a second section of the rear rail section. In one embodiment, the center rail section has a first end located between the first and second sections of the front rail section. In certain embodiments, the center rail section has a first end and a second end and the second end of the center rail section is located between the first and second sections of the rear rail section. In another embodiment, the center rail section has a first end located between the first and second sections of the front rail section and a second end located between the first and second sections of the rear rail section.

In other embodiments, the first half has a plurality of holes, the second half has a plurality of holes and at least two holes in the first half are aligned with at least two holes in the second half. In one embodiment, the spacer locating member includes a plurality of holes and at least two holes in the spacer locating member are aligned with at least two holes in the first half and with at least two holes in the second half.

In certain embodiments of the present invention, the vehicle frame rail further includes a reinforcing member having a hole and the reinforcing member is located in the enclosed space such that the hole in the reinforcing member is aligned with the hole in the first half and the hole in the second half. In other embodiments, the reinforcing member is located between the spacer locating member and the first half. In some embodiments, the hole in the reinforcing member is aligned with the hole in the spacer locating member. In other embodiments, the spacer is located in the hole in the reinforcing member.

In certain embodiments, the support member is spaced apart from the first half and contacts the second half.

Other features of the present invention will be apparent from the following description of embodiments of the invention and the accompanying drawings.

BRIEF DESCRIPTION OF THE DRAWINGS

FIG. 3A is a perspective view of a first spacer locating member that is a component of the vehicle frame rail shown in FIG. 1.

FIG. 3B is a side view of the spacer locating member shown in FIG. 3A.

FIG. 3C is a top view of the spacer locating member shown in FIG. 3A.

FIG. 4A is a perspective view of a second spacer locating member that is a component of the vehicle frame rail shown in FIG. 1.

FIG. 4B is a side view of the spacer locating member shown in FIG. 4A.

FIG. 4C is a top view of the spacer locating member shown in FIG. 4A.

FIG. 5A is a perspective view of a third spacer locating member that is a component of the vehicle frame rail shown in FIG. 1.

FIG. 5B is a side view of the spacer locating member shown in FIG. 5A.

FIG. 5C is a top view of the spacer locating member shown in FIG. 5A.

FIG. 6A is a perspective view of a fourth spacer locating member that is a component of the vehicle frame rail shown in FIG. 1.

FIG. 6B is a side view of the spacer locating member shown in FIG. 6A.

FIG. 6C is a top view of the spacer locating member shown in FIG. 6A.

FIG. 12A is a side elevational view of certain components of the vehicle frame rail shown in FIG. 1 in a partially assembled configuration.

FIG. 12B is a perspective view of area 12B in FIG. 12A.
FIG. 12C is a perspective view of area 12C in FIG. 12A.
FIG. 12D is a perspective view of area 12D in FIG. 12A.
FIG. 12E is a perspective view of area 12E in FIG. 12A.
FIG. 12F is a perspective view of area 12F in FIG. 12A.

DETAILED DESCRIPTION OF THE PREFERRED EMBODIMENTS OF THE INVENTION

Figure 1:
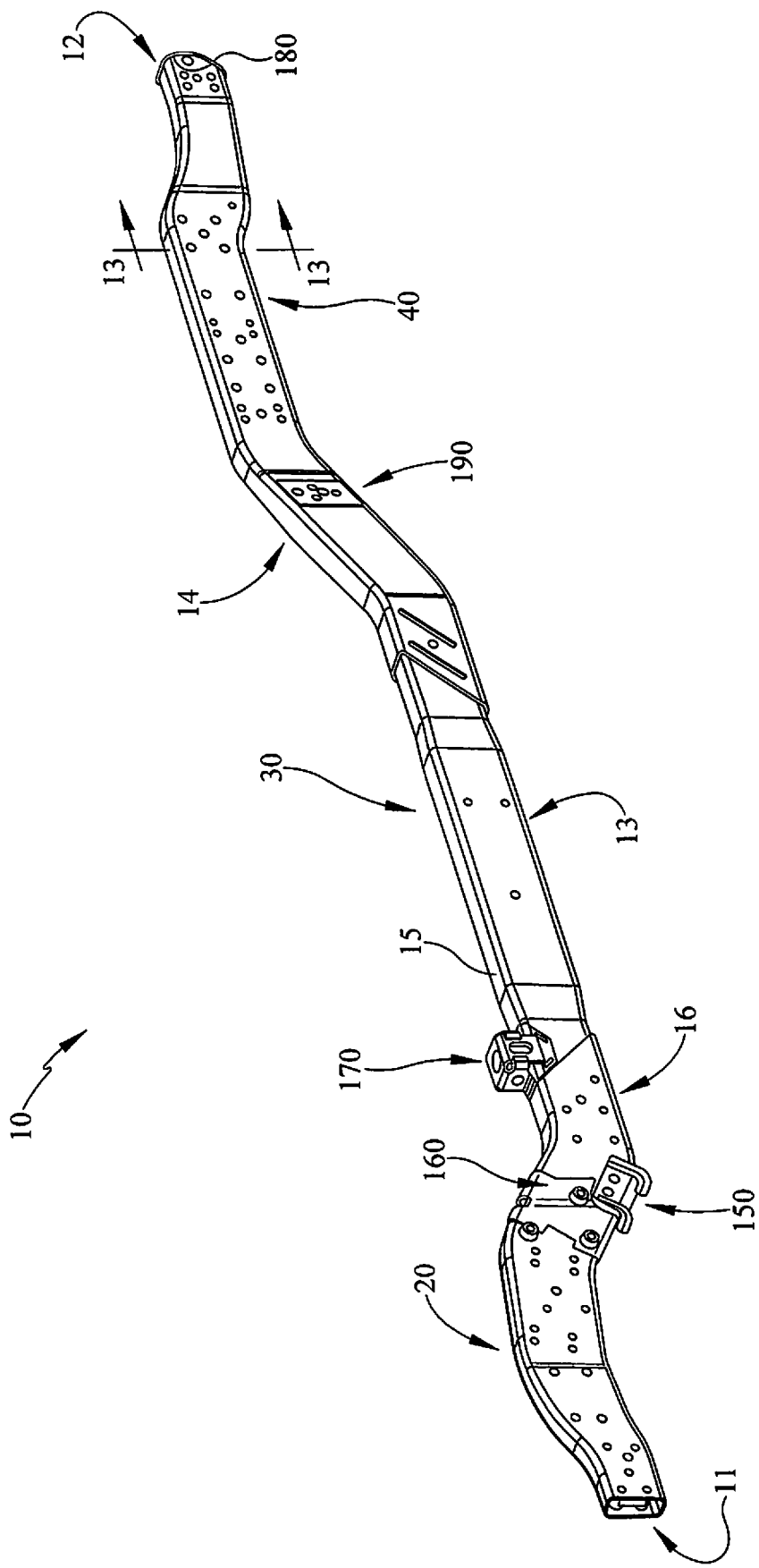
FIG. 1 is a perspective view of a vehicle frame rail according to one embodiment of the present invention.

FIG. 1 is a perspective view of a vehicle frame rail 10 according to one embodiment of the present invention. Frame rail 10 has a first or front end 11, a second or rear end 12, a first or outer side 13, a second or inner side 14, an upper surface 15, and a lower surface 16. Frame rail 10 includes a first or front rail section 20, a second or center rail section 30 and a third or rear rail section 40.

Figure 2:
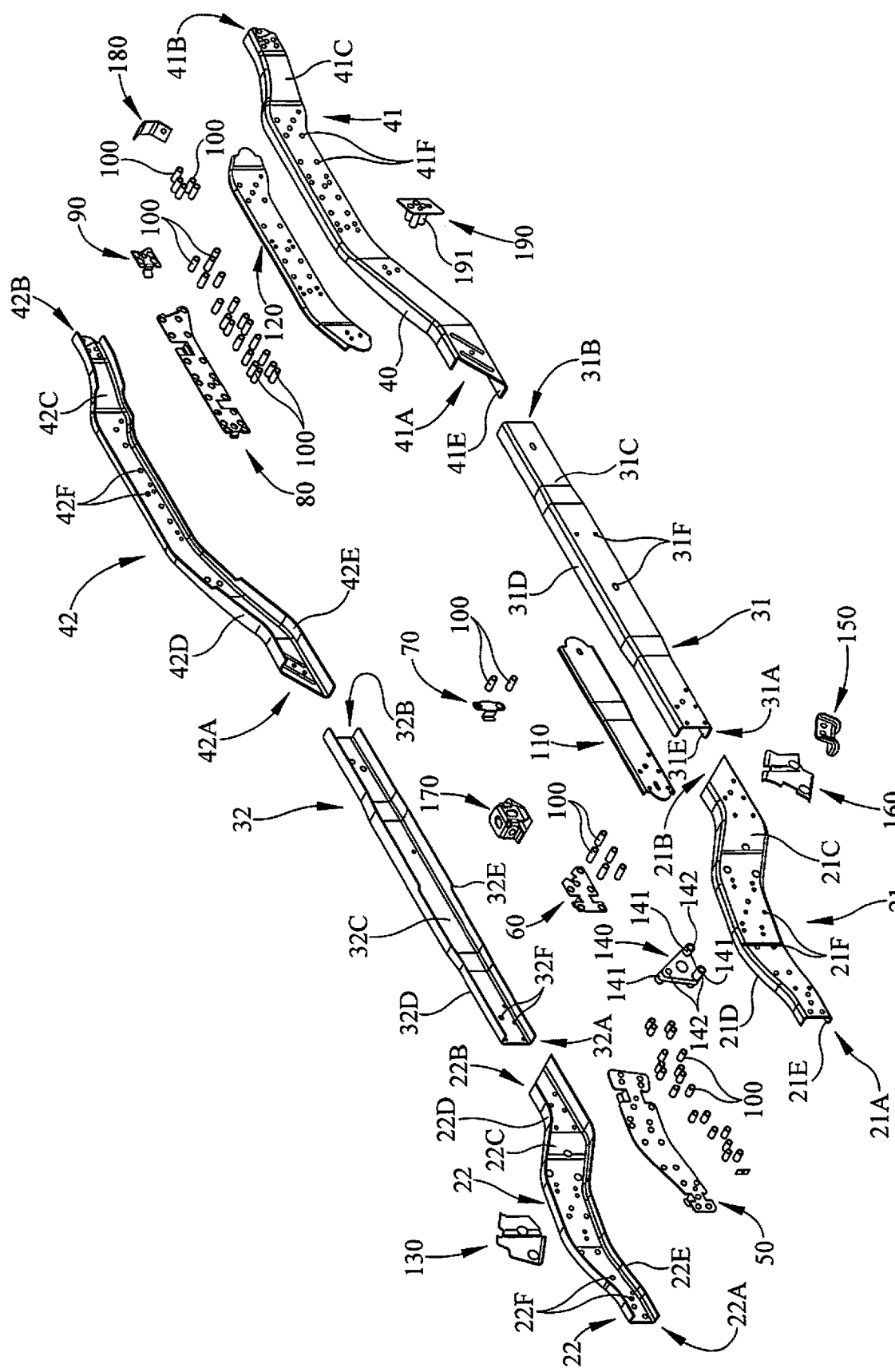
FIG. 2 is an exploded perspective view of the vehicle frame rail shown in FIG. 1.

FIG. 2 is an exploded perspective view of vehicle frame rail 10 shown in FIG. 1. As shown in FIG. 2, front rail section 20 includes a first or inner section 21 and a second or outer section 22. First section 21 of front rail section 20 has a first end 21A and a second end 21B. First section 21 in the embodiment shown is a generally C-shaped member having a central section 21C that is substantially perpendicular to a first section or flange 21D and a second section or flange 21E. First flange 21D and second flange 21E extend toward second section 22 of front rail section 20. First section 21 further includes one or more openings or holes 21F arranged in one or more hole patterns.

As used in this specification a "hole pattern" is a grouping of two or more holes. A single component of frame rails according to embodiments of the invention may include multiple hole patterns. For example, all of the holes 21F in first section 21 constitute a first hole pattern. The first two holes 21F adjacent front end 21A of first section 21 constitute a second hole pattern. Holes need not be adjacent one another to constitute a hole pattern.

Second section 22 of front rail section 20 has a first end 22A and a second end 22B. Second section 22 in the embodiment shown is a generally C-shaped member having a central section 22C that is substantially perpendicular to a first section or flange 22D and a second section or flange 22E. First flange 22D and second flange 22E extend toward first section 21 of front rail section 20. Second section 22 further includes one or more openings or holes 22F arranged in one or more hole patterns that correspond at least in part to a portion of one or more of the hole patterns in first section 21 of front rail section 20.

As also shown in FIG. 2, center rail section 30 includes a first or inner section 31 and a second or outer section 32. First section 31 of center rail section 30 has a first end 31A and a second end 31B. First section 31 in the embodiment shown is a generally C-shaped member having a central section 31C that is substantially perpendicular to a first section or flange 31D and a second section or flange 31E. First flange 31D and second flange 31E extend toward second section 32 of center rail section 30. First section 31 further includes one or more openings or holes 31F arranged in one or more hole patterns.

Second section 32 of center rail section 30 has a first end 32A and a second end 32B. Second section 32 in the embodiment shown is a generally C-shaped member having a central section 32C that is substantially perpendicular to a first section or flange 32D and a second section or flange 32E. First flange 32D and second flange 32E extend toward first section 31 of center rail section 30. Second section 32 further includes one or more openings or holes 32F arranged in one or more hole patterns that correspond at least in part to a portion of one or more of the hole patterns in first section 31 of center rail section 30.

As further shown in FIG. 2, rear rail section 40 includes a first or inner section 41 and a second or outer section 42. First section 41 of rear rail section 40 has a first end 41A and a second end 41B. First section 41 in the embodiment shown is a generally C-shaped member having a central section 41C that is substantially perpendicular to a first section or flange 41D and a second section or flange 41E. First flange 41D and second flange 41E extend toward second section 42 of rear rail section 40. First section 41 further includes one or more openings or holes 41F arranged in one or more hole patterns.

Second section 42 of rear rail section 40 has a first end 42A and a second end 42B. Second section 42 in the embodiment shown is a generally C-shaped member having a central section 42C that is substantially perpendicular to a first section or flange 42D and a second section or flange 42E. First flange 42D and second flange 42E extend toward first section 41 of rear rail section 40. Second section 42 further includes one or more openings or holes 42F arranged in a hole pattern that correspond at least in part to a portion of one or more of the hole patterns in first section 41 of rear rail section 40.

As further shown in FIG. 2, frame rail 10 also includes a first spacer locating member 50, a second spacer locating member 60, a third spacer locating member 70, a fourth spacer locating member 80, a fifth spacer locating member 90, and a plurality of spacers 100.

Referring to FIGS. 3A-3C, first spacer locating member 50 includes a main or body section 51, a plurality of support members 52, and one or more openings or holes 53 arranged in one or more hole patterns corresponding at least in part to a portion of the hole patterns in first section 21 and second section 22 of front rail section 20 of frame rail 10. Body section 51 in the embodiment shown is a plate-like member having a first section 51A and a second section 51B disposed at an angle to first section 51A. Each support member 52 in the embodiment shown includes a first section 54 extending from and edge of and generally perpendicular to body section 51 of first spacer locating member 50 and a second section 55 extending from and generally perpendicular to first section 54. The number, configuration and positioning of support members 52 are selected so as to provide the necessary support around the periphery of body section 51 and so as to position first section 51A and second section 51B of body section 51 parallel to the inner surfaces of first section 21 and second section 22 of front rail section 20. In the embodiment shown in FIGS. 3A-3C, first sections 54 of support members 52 extending from first section 51A are longer than first sections 54 of support members 52 extending from second section 51B.

Referring to FIGS. 4A-4C, second spacer locating member 60 includes a main or body section 61, a plurality of support members 62 and one or more openings or holes 63 arranged in one or more hole patterns corresponding at least in part to a portion of the hole patterns in first section 21 and second section 22 of front rail section 20 and of first section 31 and second section 32 of center rail section 30 of frame rail 10. Body section 61 of second spacer locating member 60 is a substantially flat plate-like member. Each support member 62 in the embodiment shown includes a first section 64 extending from and edge of and generally perpendicular to body section 61 of first spacer locating member 60 and a second section 65 extending from and generally perpendicular to first section 64. The number, configuration and positioning of support members 62 are selected so as to provide the necessary support around the periphery of body section 61 and so as to position body section 61 parallel to the inner surfaces of first section 21 and second section 22 of front rail section 20 and of first section 31 and second section 32 of center rail section 30.

Referring to FIGS. 5A-5C, third spacer locating member 70 includes a main or body section 71, a plurality of support members 72 and one or more openings or holes 73 arranged in one or more hole patterns corresponding at least in part to a portion of the hole patterns in first section 31 and second section 32 of center rail section 30 of frame rail 10. Body section 71 of third spacer locating member 70 is a substantially flat plate-like member. Each support member 72 in the embodiment shown includes a first section 74 extending from an edge of and generally perpendicular to body section 71 of first spacer locating member 70 and a second section 75 extending from and generally perpendicular to first section 74. The number, configuration and positioning of support members 72 are selected so as to provide the necessary support around the periphery of body section 71 and so as to position body section 71 parallel to the inner surfaces of first section 31 and second section 32 of center rail section 30.

Referring to FIGS. 6A-6C, fourth spacer locating member 80 includes a main or body section 81, a plurality of support members 82 and one or more openings or holes 83 arranged in one or more hole patterns corresponding at least in part to a portion of the hole patterns in first section 41 and second section 42 of rear rail section 40 of frame rail 10. Body section 81 of fourth spacer locating member 80 is a substantially flat plate-like member. Each support member 82 in the embodiment shown includes a first section 84 extending from an edge of and generally perpendicular to body section 81 of first spacer locating member 80 and a second section 85 extending from and generally perpendicular to first section 84. The number, configuration and positioning of support members 82 are selected so as to provide the necessary support around the periphery of body section 81 and so as to position body section 81 parallel to the inner surfaces of first section 41 and second section 42 of rear rail section 40.

Figure 7C:
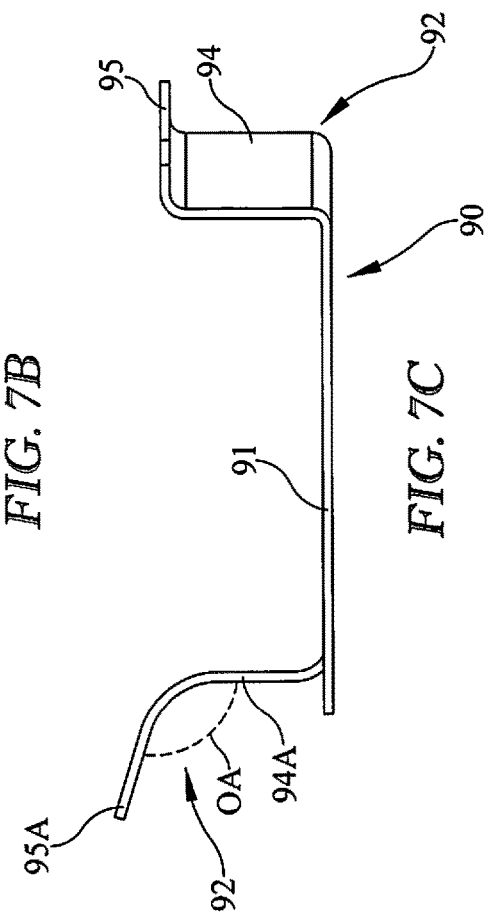
FIG. 7C is a top view of the spacer locating member shown in FIG. 7A.
Figure 7B:
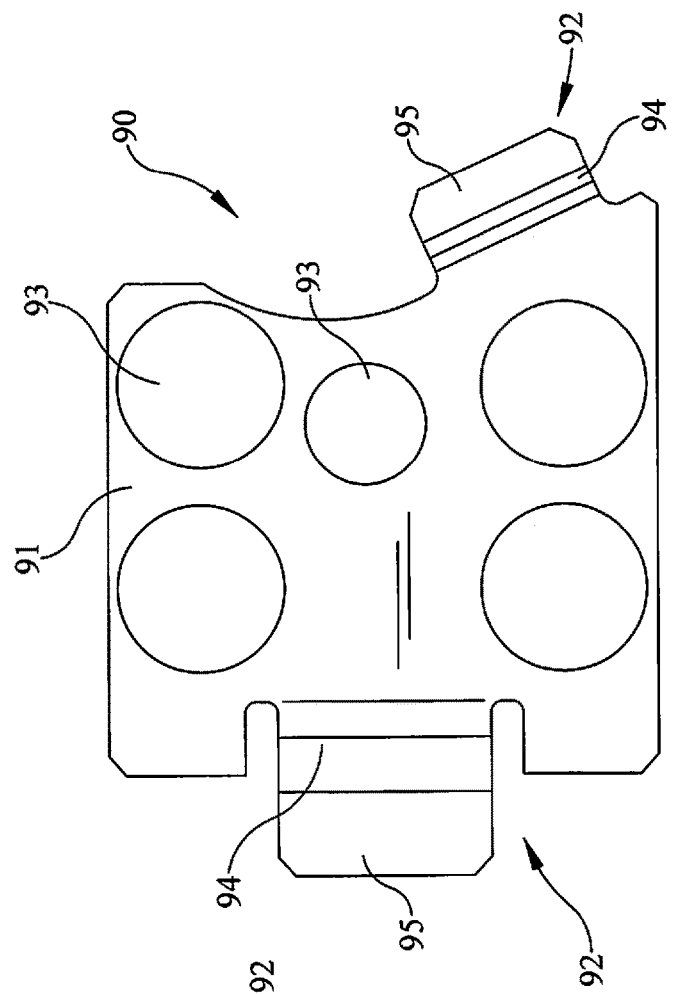
FIG. 7B is a side view of the spacer locating member shown in FIG. 7A.
Figure 7A:
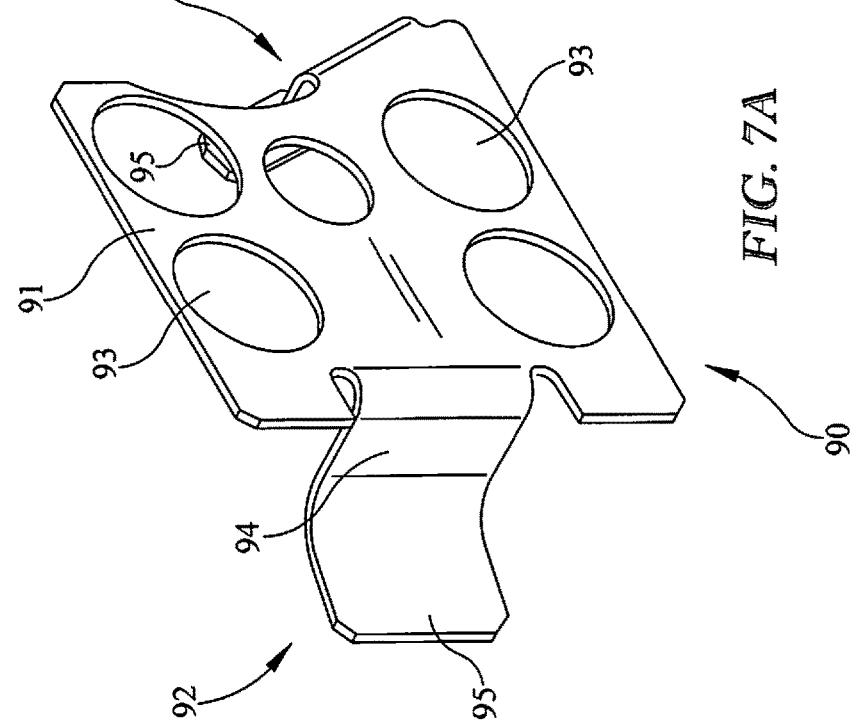
FIG. 7A is a perspective view of a fifth spacer locating member that is a component of the vehicle frame rail shown in FIG. 1.

Referring to FIGS. 7A-7C, fifth spacer locating member 90 includes a main or body section 91, a plurality of support members 92 and one or more openings or holes 93 arranged in one or more hole patterns corresponding at least in part to a portion of the hole patterns in first section 41 and second section 42 of rear rail section 40 of frame rail 10. Body section 91 of fifth spacer locating member 90 is a substantially flat plate-like member. One support member 92 in the embodiment shown includes a first section 94 extending from an edge of and generally perpendicular to body section 91 of fifth spacer locating member 90 and a second section 95 extending from and generally perpendicular to first section 94. Another support member 92 in the embodiment shown includes a first section 94A extending from and generally perpendicular to body section 91 of fifth spacer locating member 90 and a second section 95A extending from and disposed at an obtuse angle OA to first member 94A. The number, configuration and positioning of support members 92 are selected so as to provide the necessary support around the periphery of body section 91 and so as to position body section 91 parallel to the inner surfaces of first section 41 and second section 42 of rear rail section 40.

Figure 8:
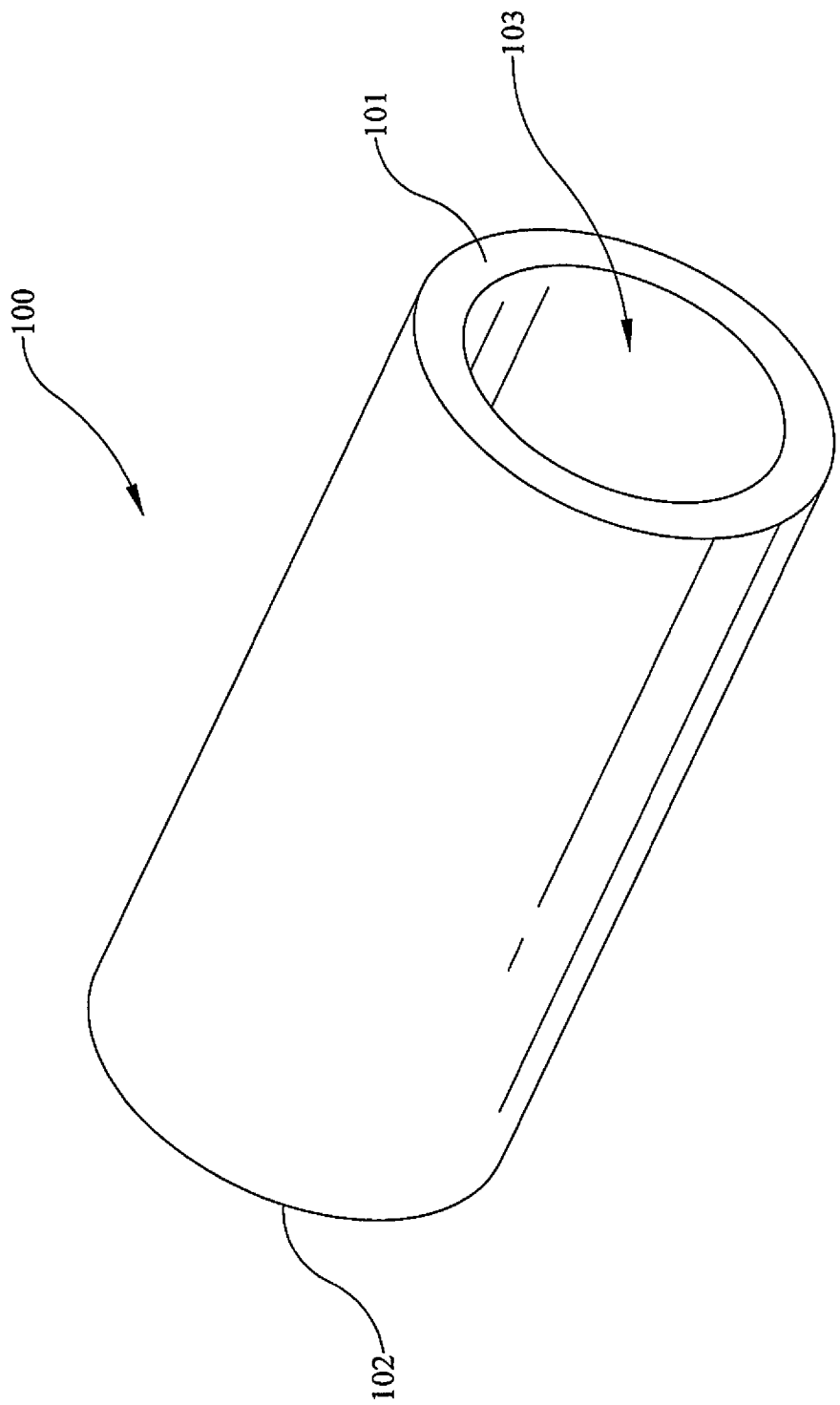
FIG. 8 is a perspective view of a spacer that is a component of the vehicle frame rail shown in FIG. 1.

As shown in FIG. 8, each spacer 100 includes a first end 101, a second end 102 and an opening or through bore 103 extending from first end 101 to second end 102.

Figure 9:
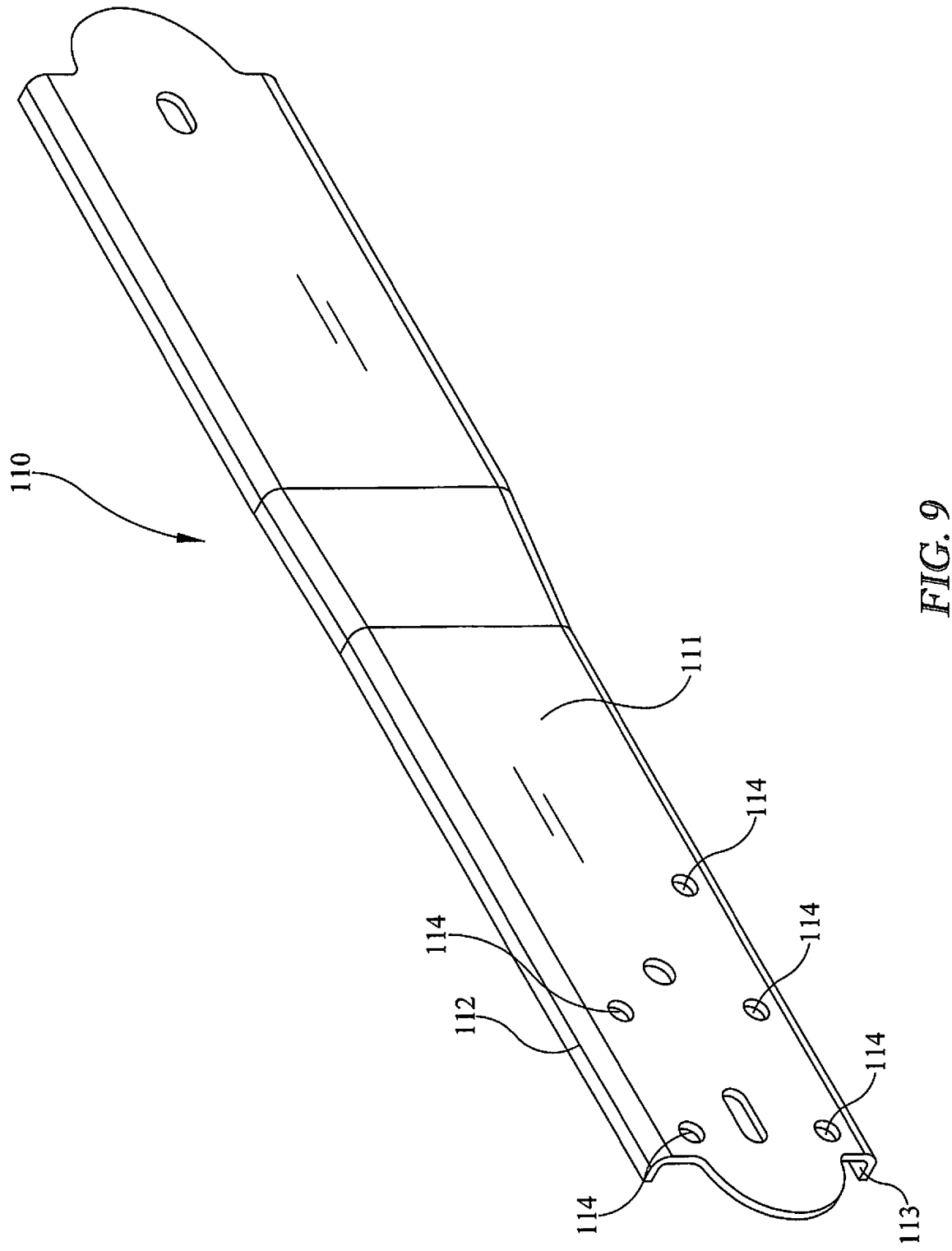
FIG. 9 is a perspective view of a first reinforcing member that is a component of the vehicle frame rail shown in FIG. 1.

As also shown in FIG. 2, frame rail 10 in the embodiment shown includes a first reinforcing member 110 and a second reinforcing member 120. First reinforcing member 110 (FIG. 9) includes a main or body section 111, a first flange 112 extending generally perpendicular to and along one side of body section 111, a second flange 113 extending generally perpendicular to and along one side of body section 111, and one or more openings or holes 114 arranged in one or more hole patterns.

Figure 10:
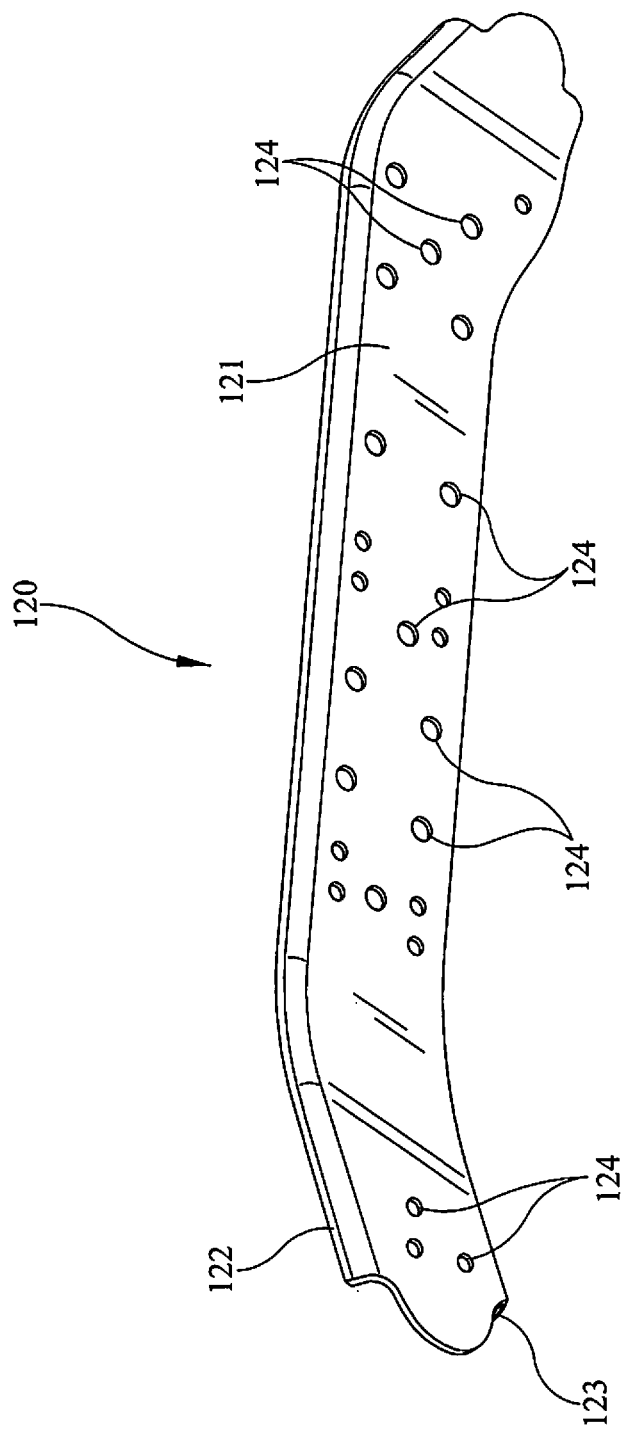
FIG. 10 is a perspective view of a second reinforcing member that is a component of the vehicle frame rail shown in FIG. 1.

Referring to FIG. 10, second reinforcing member 120 includes a main or body section 121, a first flange 122 extending generally perpendicular to and along one side of body section 121, a second flange 123 extending generally perpendicular to and along one side of body section 121, and one or more openings or holes 124 arranged in one or more hole patterns.

As further shown in FIG. 2, frame rail 10 includes one or more brackets and/or reinforcing members. In the embodiment shown in FIG. 2, frame rail 10 includes a steering gear reinforcement 130, a steering gear bracket 140, a stabilizer bar attachment bracket 150, a steering gear reinforcement 160, a body mount bracket 170, a frame rail end plate 180, and a body mount reinforcement 190. In the embodiment shown, steering gear bracket 140 includes one or more posts 141, each of which includes a bore 142 sized to receive a fastener, such as a bolt. Body mount reinforcement 190 also includes one or more posts 191, each of which includes a bore 192 sized to receive a fastener, such as a bolt.

Figure 11:
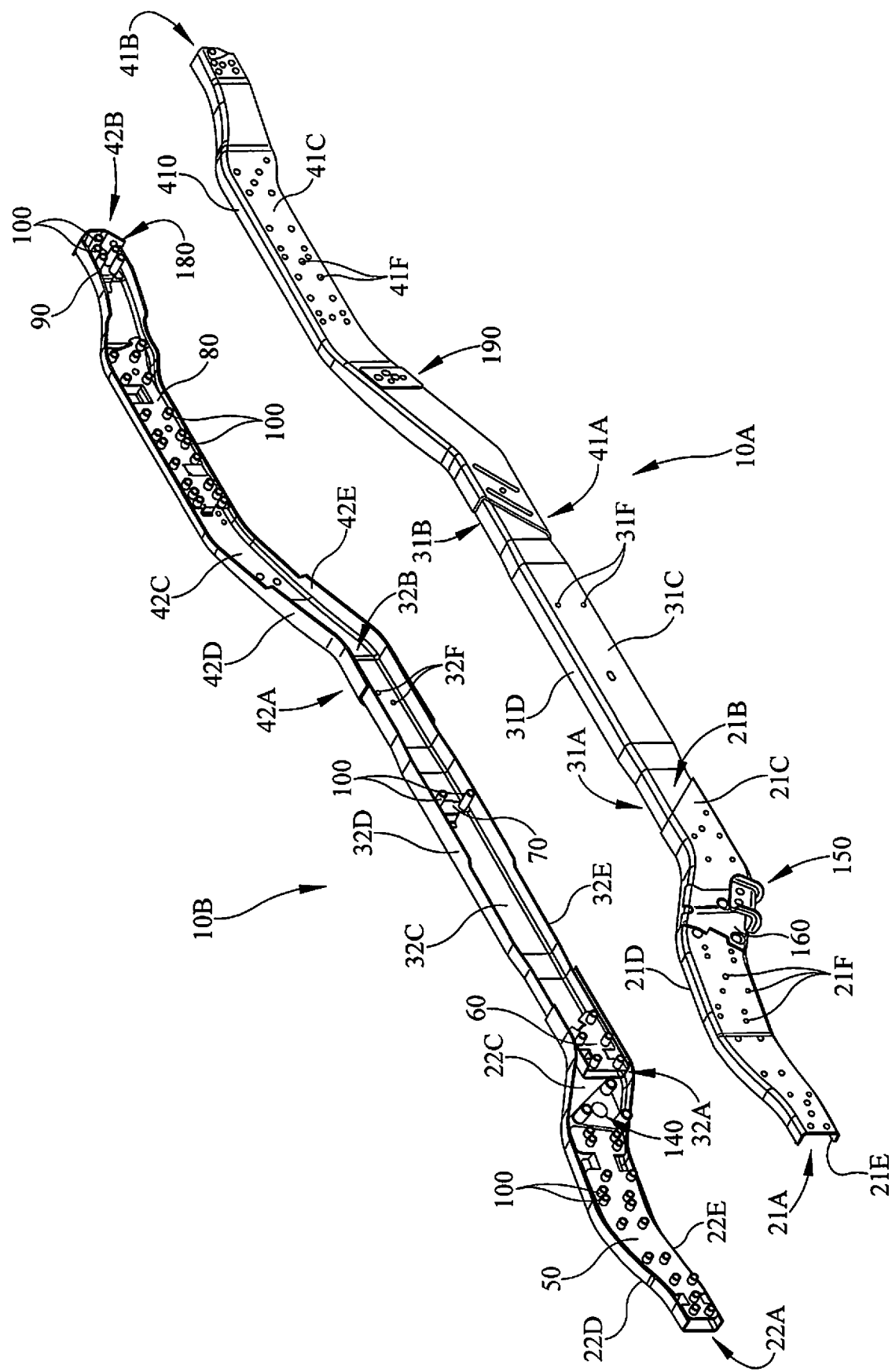
FIG. 11 is a perspective view illustrating an assembly step according to one embodiment of the present invention for vehicle frame rail shown in FIG. 1.

In one embodiment of the present invention, frame rail 10 is assembled by overlapping second end 21B of first section 21 of front rail section 20 with first end 31A of first section 31 of center rail section 30 such that a portion of first section 31 is nested within first section 21 between first flange 21D and second flange 21E of first section 21. Note that in the embodiment shown, several holes 21F in first section 21 align with several holes 31F in first section 31 in the area of overlap. First section 21 and first section 31 are then welded together or secured together by other means. Similarly, second end 31B of first section 31 of center rail section 30 is overlapped with first end 41A of first section 41 of rear rail section 40 such that a portion of first section 31 is nested within first section 41 between first flange 41D and second flange 41E. First section 31 and first section 41 are then welded together or secured together by other means. This forms a first half or outer frame rail side 10A of frame rail 10 as shown in FIG. 11.

Second end 22B of second section 22 of front rail section 20 is overlapped with first end 32A of second section 32 of center rail section 30 such that a portion of second section 32 is nested within second section 22 between first flange 22D and second flange 22E of second section 22. Note that in the embodiment shown, several holes 22F in second section 22 align with several holes 32F in second section 32 in the area of overlap. Second section 22 and second section 32 are then welded together or secured together by other means. Similarly, second end 32B of second section 32 of center rail section 30 is overlapped with first end 42A of second section 42 of rear rail section 40 such that a portion of second section 32 is nested within second section 42 between first flange 42D and second flange 42E. Second section 32 and second section 42 are then welded together or secured together by other means. This forms a second half or inner frame rail side 10B of frame rail 10 as shown in FIG. 11.

First spacer locating member 50, second spacer locating member 60, third spacer locating member 70, fourth spacer locating member 80, fifth spacer locating member 90, first reinforcing member 110, second reinforcing member 120, and steering gear bracket 140 are then secured (such as by welding or other means) to either first half 10A or second half 10B of frame rail 10.

FIGS. 12A-12F show first spacer locating member 50, second spacer locating member 60, third spacer locating member 70, fourth spacer locating member 80, fifth spacer locating member 90, steering gear bracket 140, and frame rail end plate 180 positioned on and secured to second half 10B. The spacer locating members may be secured to, for example, second half 10B by any of various means, including, for example, by welding one or more of the support members of the spacer locating members to second half 10B.

To do so, first spacer locating member 50 is positioned on second section 22 of front rail section 20 such that second section 55 of one or more support members 52 contacts central section 22C of second section 22 and one or more holes 53 are aligned with one or more holes 22F in second section 22 (FIGS. 12A and 12B). Steering gear bracket 140 is also positioned on second section 22 of front rail section 20 such that one or more bores 142 in posts 141 are aligned with one or more holes 22F in second section 22.

Referring to FIGS. 12A and 12C, second spacer locating member 60 is positioned on second section 32 of center rail section 30 such that second section 65 of one or more support members 62 contacts central section 32C of second section 32 and one or more holes 63 are aligned with one or more holes 32F in second section 32. As discussed above, and as shown in FIG. 9, several holes 22F in second section 22 of front rail section 20 align with several holes 32F in second section 32 of center rail section 30 when second section 22 and second section 32 are joined to form part of second half 10B of frame rail 10. In the embodiment shown in FIGS. 10A and 10B, one or more holes 63 in second spacer locating member 60 align with one or more holes 22F in second section 22 and with one or more holes 32F in second section 32.

Third spacer locating member 70 is positioned on second section 32 of center rail section 30 such that second section 75 of one or more support members 72 contacts central section 32C of second section 32 and one or more holes 73 are aligned with one or more holes 32F in second section 32. (FIGS. 12A and 12D)

Fourth spacer locating member 80 is positioned on second section 42 of rear rail section 40 such that second section 85 of one or more support members 82 contacts central section 42C of second section 42 and one or more holes 83 are aligned with one or more holes 42F in second section 42. (FIGS. 12A and 12E)

Fifth spacer locating member 90 is positioned on second section 42 of rear rail section 40 such that section 95 of one or more support members 92 contacts central section 42C of second section 42 and one or more holes 93 are aligned with one or more holes 42F in second section 42. (FIGS. 12A and 12F)

Spacers 100 are then positioned in one or more of the holes in one or more of the spacer locating members. For example, as shown in FIGS. 12A and 12B, a spacer 100 is placed in each hole 53 in first spacer locating member 50. In this manner, each bore 103 in a spacer 100 is aligned with a hole 22F in second section 22 of front rail section 20. In certain embodiments of the invention, spacers 100 are welded or otherwise secured to the spacer locating members, such as first spacer locating member 50. One or more spacers 100 can also be placed in second spacer locating member 60, third spacer locating member 70, fourth spacer locating member 80 and/or fifth spacer locating member 90 in the same manner.

First reinforcing member 110 is positioned on first section 31 of center rail section 30 such that holes 114 are aligned with one or more holes 31F in first section 31. Second reinforcing member 120 is positioned on first section 41 of rear rail section 40 such that one or more holes 124 are aligned with one or more holes 41F in first section 41. Previously placed spacers 100 that are aligned with holes 114 and 124 will extend through those holes. Additional spacers 100 can also be placed in one or more holes 114 and/or 124. Spacers 100 can be welded or otherwise secured to first reinforcing member 110 and second reinforcing member 120 if desired.

First half 10A and second half 10B are then positioned such that one or more holes 21F, 31F and/or 41F in first section 21, first section 31 and/or first section 41 align with one or more holes 22F, 32F and/or 42F in second section 22, second 32 and/or second section 42. This also aligns one or more holes 21F, 31F and/or 41F with holes 53, 63, 73, 83, and/or 93 in first spacer locating member 50, second spacer locating member 60, third spacer locating member 70, fourth spacer locating member 80 and/or fifth spacer locating member 90 that are aligned with the corresponding holes 22F, 32F and/or 40F. In this manner, holes 114 in first reinforcing member 110 are also aligned with one or more holes 63 in second spacer locating member 60 and with one or more holes 32F in second section 32, and one or more holes 124 in second reinforcing member 120 are aligned with one or more holes 83 in fourth spacer locating member 80 and with one or more holes 42F in second section 42.

Figure 13:
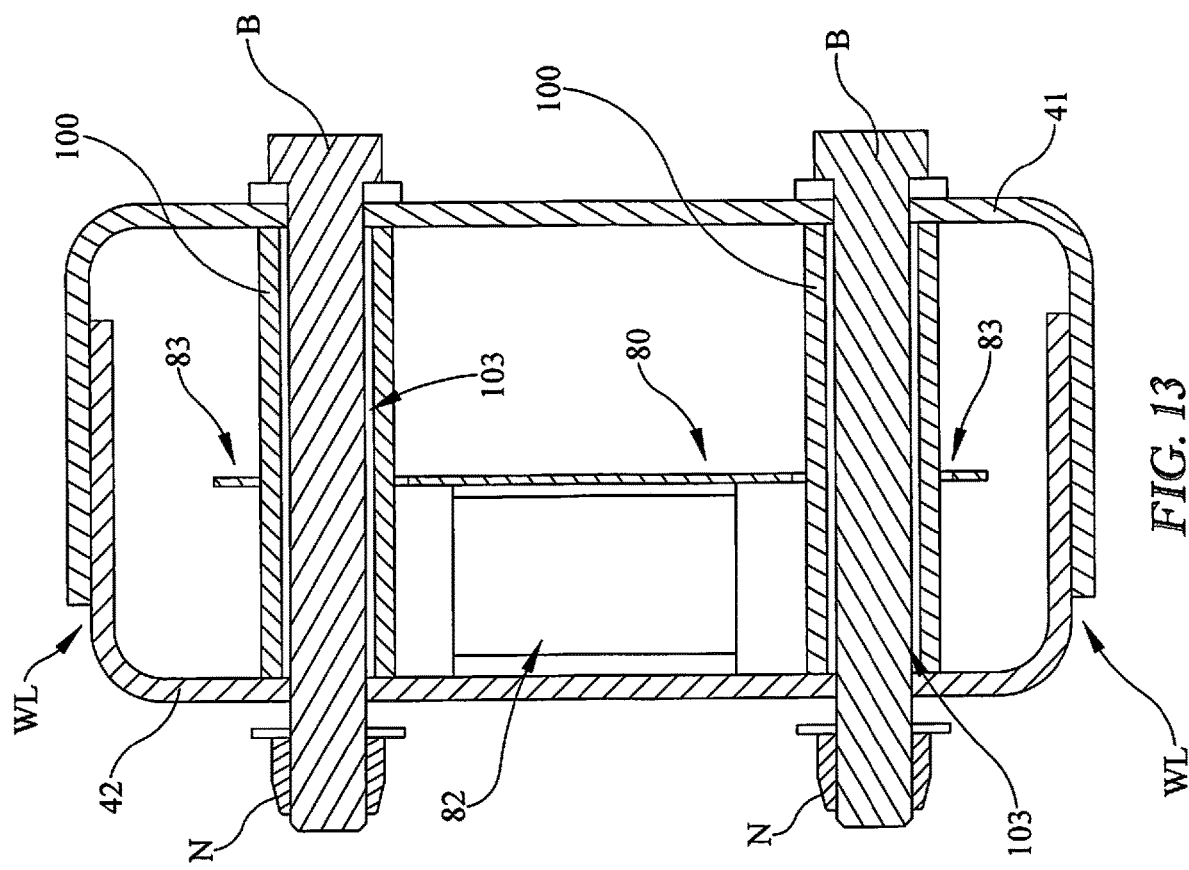
FIG. 13 is a sectional view taken along line 13-13 in FIG. 1.

First half 10A and second half 10B are then secured together, such as by welding along the outer edges of first half 10A and second half 10B at weld lines or locations WL so as to form an enclosed space between first half 10A and second half 10B. Note that in the embodiment shown, second half 10B is nested within first half 10A. (FIG. 13)

Steering gear reinforcement 130, stabilizer bar attachment bracket 150, steering gear reinforcement 160, body mount bracket 170, frame rail end plate 180, and body mount reinforcement 190 can then be secured to first half 10A and second half 10B in the locations shown in FIG. 1. Note that posts 191 of body mount reinforcement 190 extend through holes 41F on first section 41 of rear rail section 40. Bolts or other fasteners may be used to connect frame rail 10 to a vehicle body and other components, including, for example, via steering gear reinforcement 130, steering gear bracket 140, stabilizer bar attachment bracket 150, steering gear reinforcement 160, body mount bracket 170, frame rail end plate 180, and body mount reinforcement 190. For example, FIG. 13 illustrates two bolts B extending through openings 41F in first section 41 of rear rail section 40, openings 124 in second reinforcing member 120, bores 103 in spacers 100, openings 83 in fourth spacer locating member 80, and openings 42F in second section 42 of rear rail section 40. Nuts N or other securement means can be used to retain bolts B to frame rail 10. Spacers 100 provide support to frame rail 10 at the fastening locations and resist the clamping forces of bolts B and nuts N.

Figure 14:
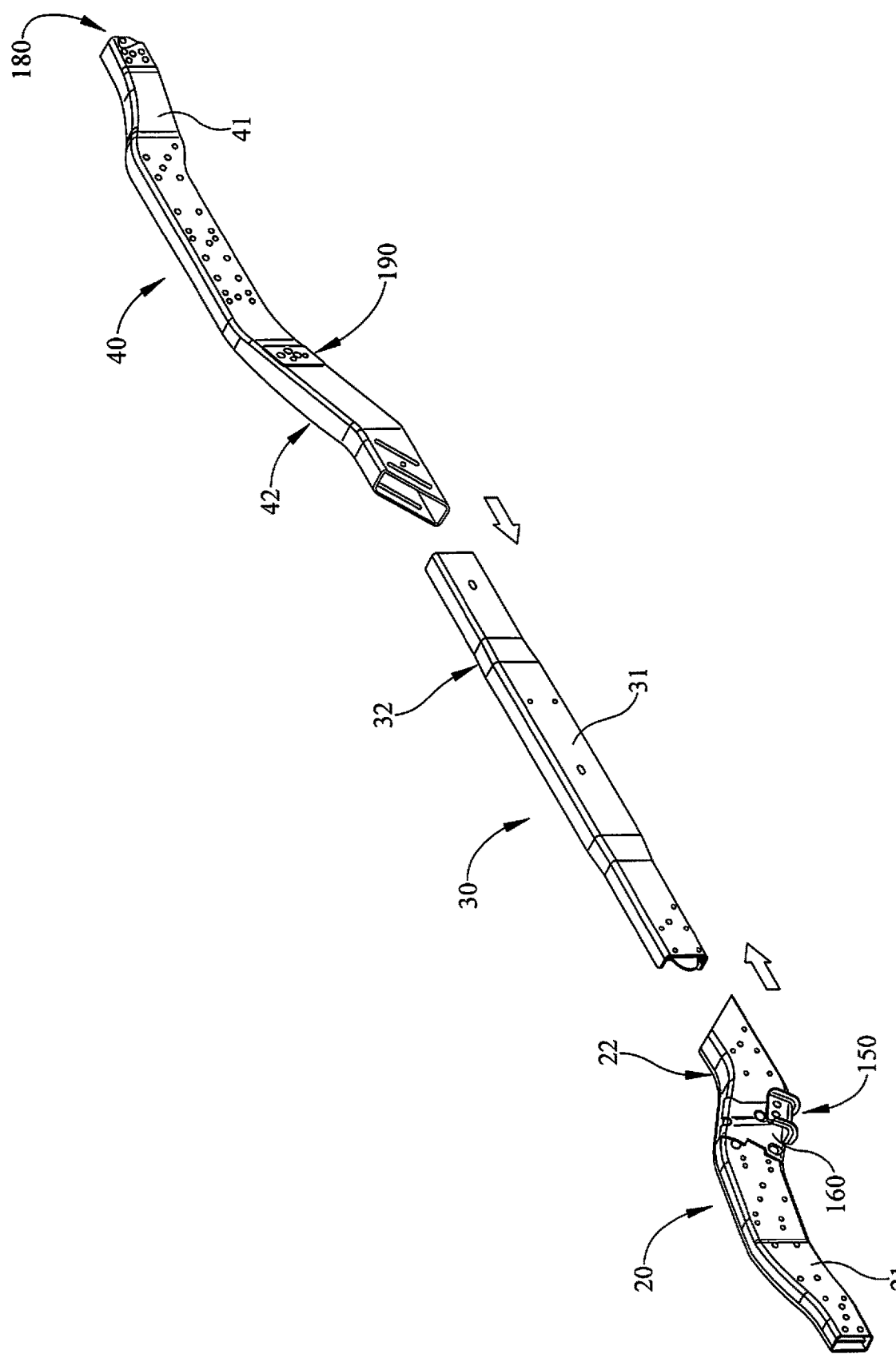
FIG. 14 is a perspective view illustrating an assembly step according to another embodiment of the present invention for vehicle frame rail shown in FIG. 1.

In another embodiment of the invention, frame rail 10 is assembled by first forming front rail section 20, center rail section 30 and rear rail section 40, and then connecting center rail section 30 to front rail section 20 and rear rail section 40. For example, front rail section 20 can be formed by securing the desired spacer locating members and other components within first section 21 and second section 22 of front rail section 20 and then securing first section 21 and second section 22 together such that second section 22 is nested within first section 21. Center rail section 30 and rear rail section 40 can be assembled in the same manner. Opposite ends of center rail section 30 are then slid into one end of front rail section 20 and one end of rear rail section 40, respectively, and the sections are welded together. (FIG. 14).

Figure 15:
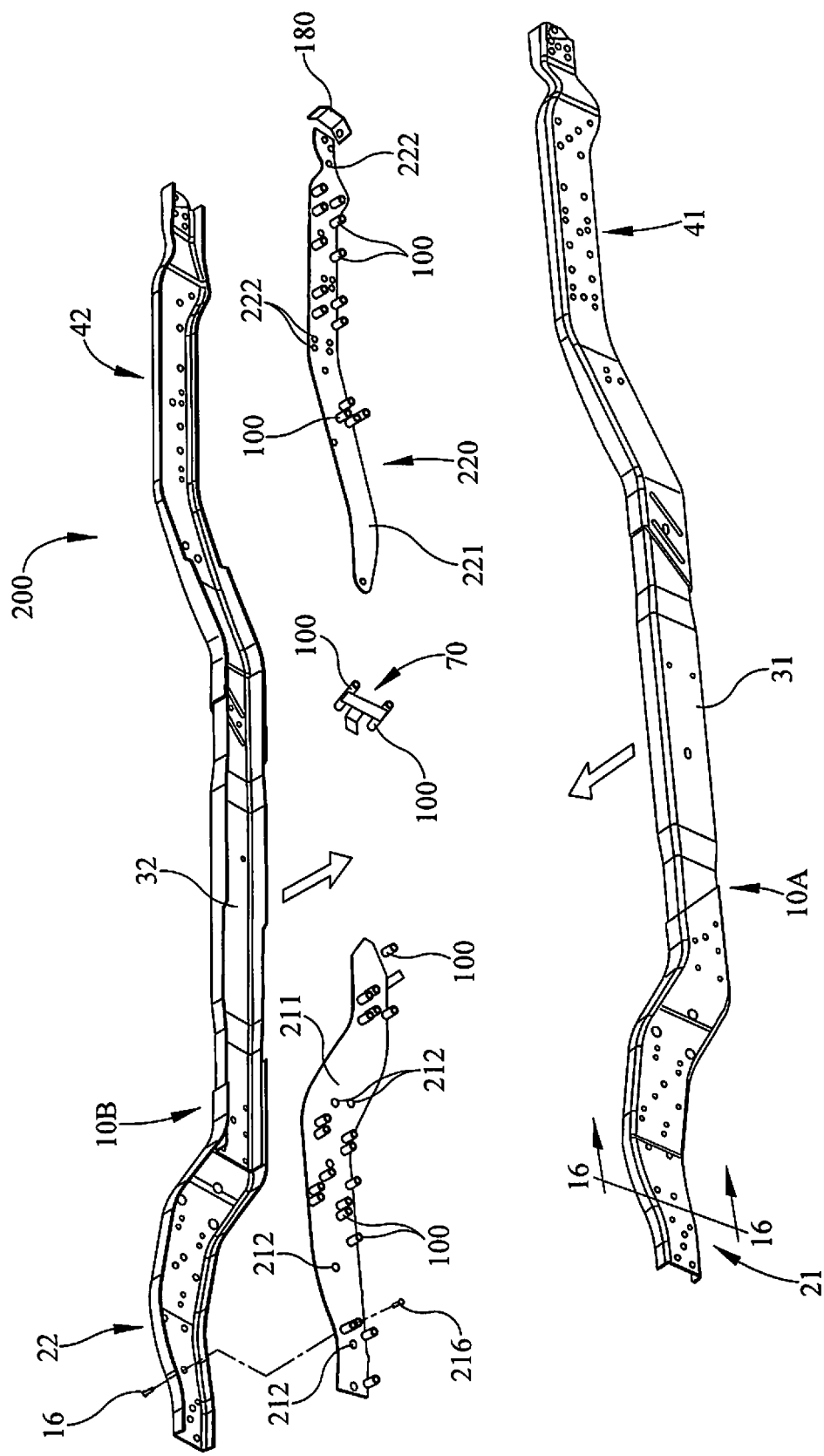
FIG. 15 is an exploded perspective view of a vehicle frame rail according to another embodiment of the present invention.
Figure 16:
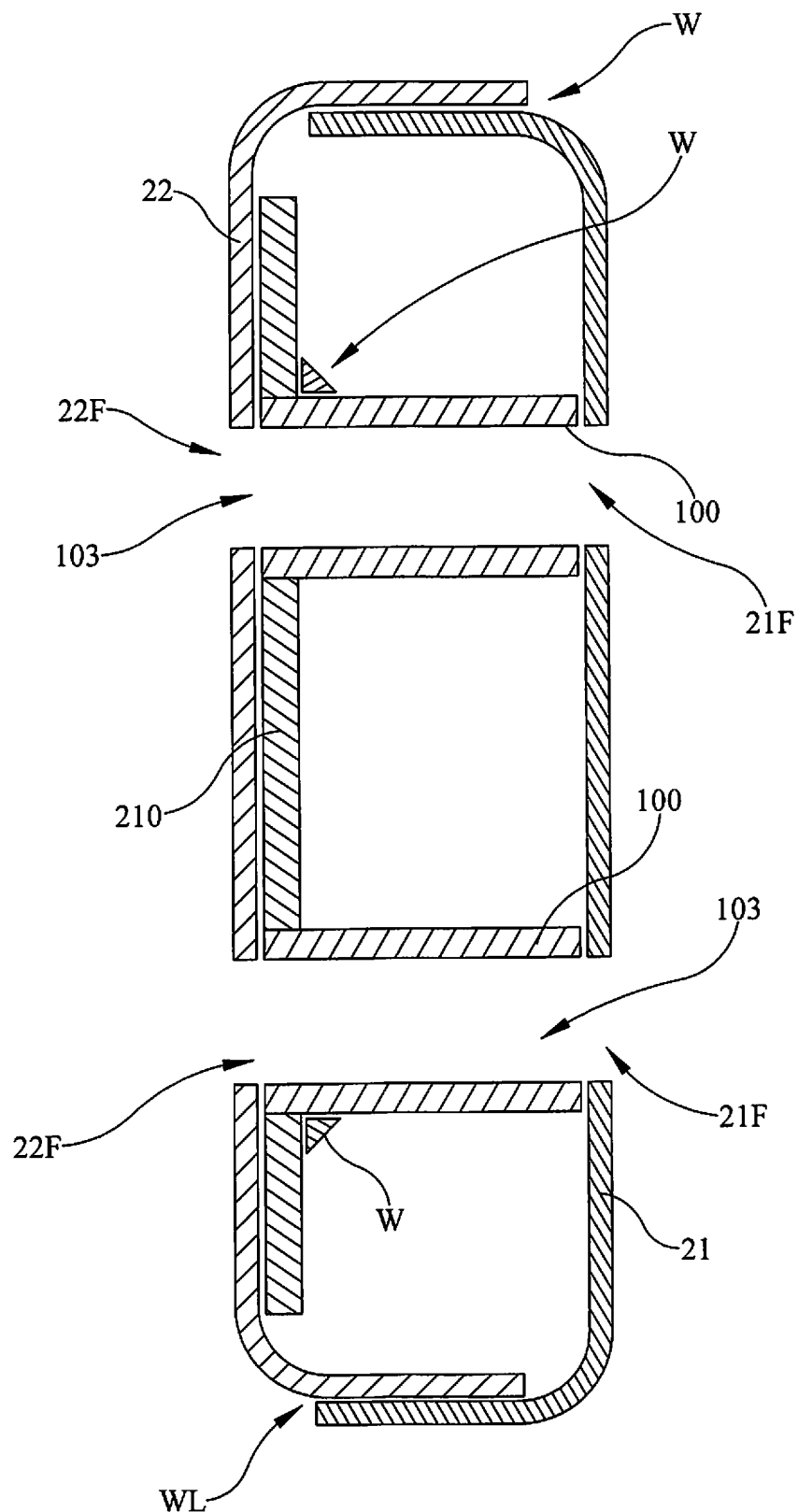
FIG. 16 is a cross sectional view of the vehicle frame rail shown in FIG. 15 taken along line 16-16.

FIGS. 15 and 16 show a vehicle frame rail 200 according to another embodiment of the present invention. This embodiment of the invention does not utilize first spacer locator member 50, second spacer locator member 60, fourth spacer locator member 80, fifth spacer locator member 90, first reinforcing member 110, or second reinforcing member 120. Frame rail 200 does utilize third spacer locating member 70, and includes a first reinforcing member 210 and a second reinforcing member 220 differing in configuration from first reinforcing member 110 and second reinforcing member 120. Frame rail 200 may also include steering gear reinforcement 130, steering gear bracket 140, stabilizer bar attachment bracket 150, steering gear reinforcement 160, body mount bracket 170, frame rail end plate 180, and body mount reinforcement 190.

As shown in FIG. 15, first reinforcing member 210 includes a main or body section 211 and one or more openings or holes 212 arranged in one or more hole patterns. Second reinforcing member 220 includes a main or body section 221 and one or more openings or holes 222 arranged in one or more hole patterns.

To assemble frame rail 200, first half 10A and second half 10B are assembled as describe above, and third spacer locating member 70, first reinforcing member 210, second reinforcing member 220, spacers 100 and other components are secured to and positioned within first half 10A and second half 10B in the manner described above. Spacers 100 may be secured to first reinforcing member 210 and/or second reinforcing member 220, such as, by example, welds W (FIG. 16). First half 10A and second half 10B are then positioned such that first flanges 21D, 31D and 41D of first sections 21, 31, and 41 of front rail section 20, center rail section 30 and rear rail section 40 are located adjacent first flanges 22D, 32D and 42D, respectively, and between first flanges 22D, 32D and 42D and second flanges 22E, 32E and 42E of second sections 22, 32 and 42 of front rail section 20, center rail section 30 and rear rail section 40. First half 10A and second half 10B are also positioned such that second flanges 22E, 32E and 42E of second sections 22, 32, and 42 of front rail section 20, center rail section 30 and rear rail section 40 are located adjacent second flanges 21E, 31E and 41E, respectively, and between first flanges 21D, 31D and 41D and second flanges 21E, 31E and 41E of first sections 21, 31 and 41 of front rail section 20, center rail section 30 and rear rail section 40. First half 10A and second half 10B are then secured together, such as by welding along the outer edges of first half 10A and second half 10B at weld lines or locations WL so as to form an enclosed space between first half 10A and second half 10B. In this manner, first half 10A and second half 10B overlap, as shown in FIG. 16, as opposed to one of the two halves being nested within the other half as shown in FIG. 13.

Figure 17:
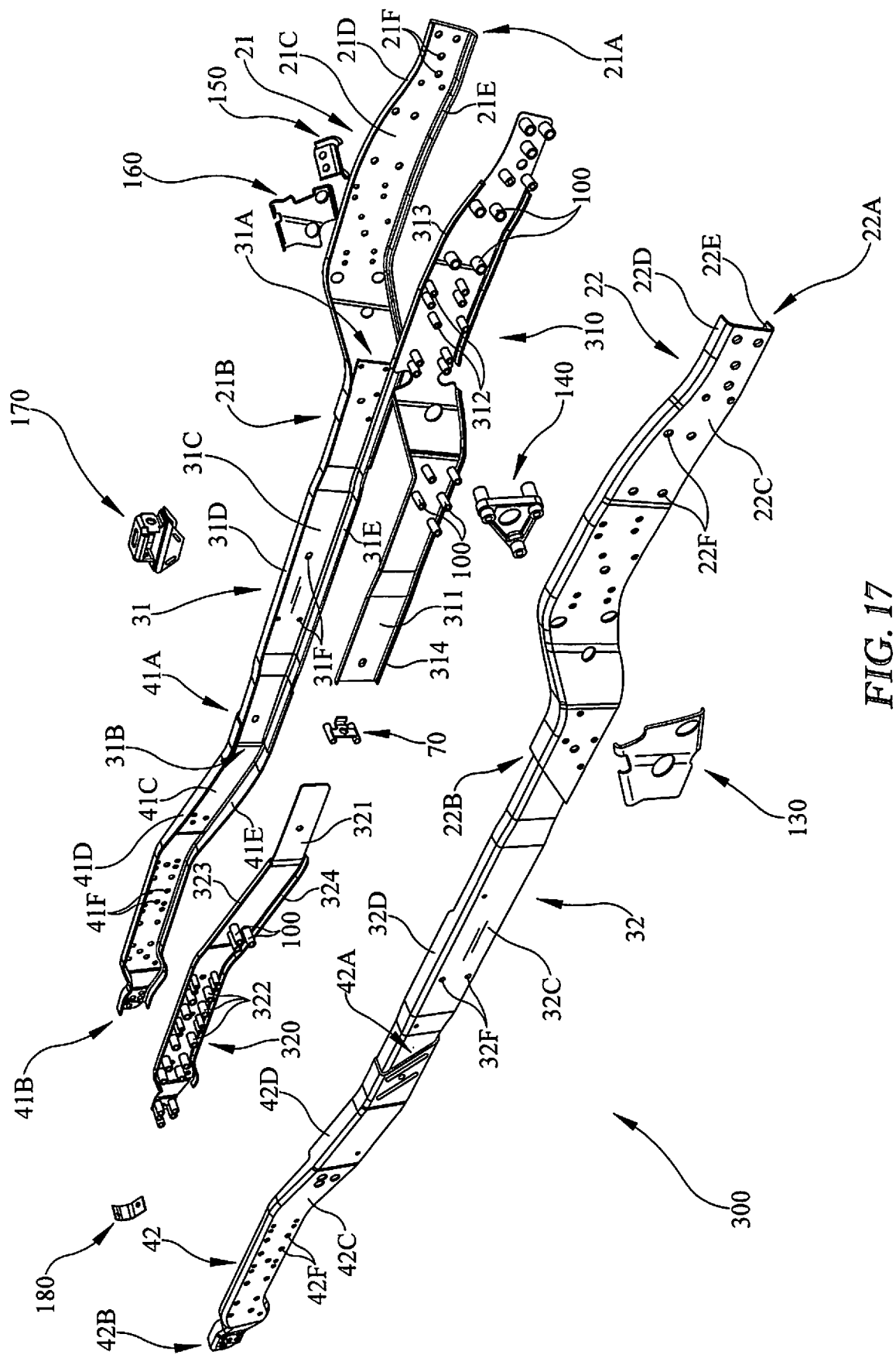
FIG. 17 is an exploded perspective view of a vehicle frame rail according to another embodiment of the present invention.

FIG. 17 is an exploded perspective view of a vehicle frame rail 300 according to another embodiment of the present invention. Like the embodiment of FIGS. 15 and 16, this embodiment does not utilize first spacer locator member 50, second spacer locator member 60, fourth spacer locator member 80, fifth spacer locator member 90, first reinforcing member 110, or second reinforcing member 120. Frame rail 300 does utilize third spacer locating member 70, and includes a first reinforcing member 310 and a second reinforcing member 320 differing in configuration from first reinforcing members 110 and 210 and second reinforcing members 120 and 220.

As shown in FIG. 17, first reinforcing member 310 includes a main or body section 311, one or more openings or holes 312 arranged in one or more hole patterns, a first flange 313 extending perpendicular to and along one edge of body section 311, and a second flange 314 extending perpendicular to and along the opposite edge of body section 311. Second reinforcing member 320 includes a main or body section 321, one or more openings or holes 322 arranged in one or more hole patterns, a first flange 323 extending perpendicular to and along one edge of body section 321, and a second flange 324 extending perpendicular to and along the opposite edge of body section 321. Frame rail 300 may be assembled in the manner described above in connection with frame rail 200.

The various rail sections, spacer locating members and spacers of the present invention may be constructed from any material having sufficient strength and durability to withstand the forces experienced by the components in the applicable operating environment.

Although various embodiments of the invention have been shown and described in detail the same is to be taken by way of example only and is not a limitation on the scope of the invention. Numerous modifications can be made to the embodiments disclosed without departing from the scope of the invention. For example, one or both of first reinforcing member 110 and second reinforcing member 120 can be eliminated from the embodiments described above. One or more of the spacer locating members can also be eliminated. Additional reinforcing members and/or spacer locating members can be added to the embodiments. In other embodiments, hole patterns other than those illustrated can be utilized. The shape of the spacer locating members and reinforcing members, as well as the positioning of the spacer locating members and reinforcing members, can also be other than those specifically illustrated. Furthermore, either the nested or the overlapping configurations of first half 10A and second half 10B can be utilized with any of the embodiments disclosed. Other modifications to the embodiments described and illustrated are also within the scope of the invention.

What is claimed is:

1. A vehicle frame rail, including:
   a first half having a hole;
   a second half having a hole, the second half connected to the first half such that the hole in the first half is aligned with the hole in the second half and so as to form an enclosed space between the first half and the second half;
   a spacer locating member supported on either the first half or the second half but not both the first half and the second half, the spacer locating member having a body section spaced apart from the first half and the second half, a hole, and a support member spaced apart from the first half and contacting either the first half or the second half; and
   a spacer having a first end, a second end and a bore extending from the first end to the second end, the spacer located in the hole of the spacer locating member such that the bore is aligned with the hole in the first half and the hole in the second half.

2. The vehicle frame rail according to claim 1, where in the spacer locating member is located within the enclosed space.

3. The vehicle frame rail according to claim 1, wherein the body section of the spacer locating member is located between the first half and the second half.

4. The vehicle frame rail according to claim 1, wherein the support member has a first section extending from the body section of the spacer locating member and a second section extending from the first section.

5. The vehicle frame rail according to claim 4, wherein the first section of the support member is perpendicular to the body section of the spacer locating member.

6. The vehicle frame rail according to claim 5, wherein the second section of the support member is perpendicular to the first section of the support member.

7. The vehicle frame rail according to claim 4, wherein the first section of the support member extends from an edge of the body section of the spacer locating member.

8. The vehicle frame rail according to claim 1, wherein the first half has a first flange and a second flange, the second half has a first flange and a second flange, and wherein the first and second flanges of the second half are located between the first and second flanges of the first half.

9. The vehicle frame rail according to claim 1, wherein the vehicle frame rail has a front rail section, a center rail section and a rear rail section, the first half of the vehicle frame rail including a first section of the front rail section, a first section of the center rail section and a first section of the rear rail section, and the second half of the vehicle frame rail including a second section of the front rail section, a second section of the center rail section and a second section of the rear rail section.

10. The vehicle frame rail according to claim 9, wherein the center rail section has a first end located between the first and second sections of the front rail section.

11. The vehicle frame rail according to claim 9, wherein the center rail section has a first end and a second end and the second end of the center rail section is located between the first and second sections of the rear rail section.

12. The vehicle frame rail according to claim 9, wherein the center rail section has a first end located between the first and second sections of the front rail section and a second end located between the first and second sections of the rear rail section.

13. The vehicle frame rail according to claim 1, wherein the first half has a plurality of holes and the second half has a plurality of holes and at least two holes in the first half are aligned with at least two holes in the second half.

14. The vehicle frame rail according to claim 13, wherein the spacer locating member includes a plurality of holes and at least two holes in the spacer locating member are aligned with at least two holes in the first half and with at least two holes in the second half.

15. The vehicle frame rail according to claim 1, further including a reinforcing member having a hole, the reinforcing member located in the enclosed space such that the hole in the reinforcing member is aligned with the hole in the first half and the hole in the second half.

16. The vehicle frame rail according to claim 15, wherein the reinforcing member is located between the spacer locating member and the first half.

17. The vehicle frame rail according to claim 16, wherein the hole in the reinforcing member is aligned with the hole in the spacer locating member.

18. The vehicle frame rail according to claim 15, wherein the spacer is located in the hole in the reinforcing member.

19. The vehicle frame rail according to claim 1, wherein the body section of the spacer locating member has a planar section, the support member has a first section extending perpendicularly from the planar section and a second section extending parallel to the planar section, and the hole of the spacer locating member is located in the planar section.

20. A vehicle frame rail, including:
a first half having a hole;
a second half having a hole, the second half connected to the first half such that the hole in the first half is aligned with the hole in the second half and so as to form an enclosed space between the first half and the second half;
a spacer locating member supported on either the first half or the second half but not both the first half and the second half, the spacer locating member having a body section, a support member, and a hole, the body section of the spacer locating member having a planar section, the support member having a first section extending perpendicularly from the planar section and a second section extending parallel to the planar section, and the hole of the spacer locating member located in the planar section; and
a spacer having a first end, a second end and a bore extending from the first end to the second end, the spacer located in the hole of the spacer locating member such that the bore is aligned with the hole in the first half and the hole in the second half.

21. The vehicle frame rail according to claim 20, where in the spacer locating member is located within the enclosed space.

22. The vehicle frame rail according to claim 20, wherein the body section of the spacer locating member is located between the first half and the second half.

23. The vehicle frame rail according to claim 20, wherein the first section of the support member extends from an edge of the body section of the spacer locating member.

24. The vehicle frame rail according to claim 20, wherein the first half has a first flange and a second flange, the second half has a first flange and a second flange, and wherein the first and second flanges of the second half are located between the first and second flanges of the first half.

25. The vehicle frame rail according to claim 20, wherein the vehicle frame rail has a front rail section, a center rail section and a rear rail section, the first half of the vehicle frame rail including a first section of the front rail section, a first section of the center rail section and a first section of the rear rail section, and the second half of the vehicle frame rail including a second section of the front rail section, a second section of the center rail section and a second section of the rear rail section.

26. The vehicle frame rail according to claim 25, wherein the center rail section has a first end located between the first and second sections of the front rail section.

27. The vehicle frame rail according to claim 25, wherein the center rail section has a first end and a second end and the second end of the center rail section is located between the first and second sections of the rear rail section.

28. The vehicle frame rail according to claim 25, wherein the center rail section has a first end located between the first and second sections of the front rail section and a second end located between the first and second sections of the rear rail section.

29. The vehicle frame rail according to claim 20, wherein the first half has a plurality of holes and the second half has a plurality of holes and at least two holes in the first half are aligned with at least two holes in the second half.

30. The vehicle frame rail according to claim 29, wherein the spacer locating member includes a plurality of holes and at least two holes in the spacer locating member are aligned with at least two holes in the first half and with at least two holes in the second half.

31. The vehicle frame rail according to claim 20, further including a reinforcing member having a hole, the reinforcing member located in the enclosed space such that the hole in the reinforcing member is aligned with the hole in the first half and the hole in the second half.

32. The vehicle frame rail according to claim 31, wherein the reinforcing member is located between the spacer locating member and the first half.

33. The vehicle frame rail according to claim 31, wherein the hole in the reinforcing member is aligned with the hole in the spacer locating member.

34. The vehicle frame rail according to claim 31, wherein the spacer is located in the hole in the reinforcing member.

35. The vehicle frame rail according to claim 20, wherein the support member is spaced apart from the first half and contacts the second half.

36. A vehicle frame rail, including:
   a first half having a hole;
   a second half having a hole, the second half connected to the first half such that the hole in the first half is aligned with the hole in the second half and so as to form an enclosed space between the first half and the second half;
   a spacer locating member, the spacer locating member having a body section spaced apart from the first half and the second half, a hole, and a support member spaced apart from the first half and contacting the second half;
   a reinforcing member having a hole, the reinforcing member located in the enclosed space such that the hole in the reinforcing member is aligned with the hole in the first half and the hole in the second half; and
   a spacer located in the hole in the reinforcing member, the spacer having a first end, a second end and a bore extending from the first end to the second end, the spacer located in the hole of the spacer locating member such that the bore is aligned with the hole in the first half and the hole in the second half.

37. The vehicle frame rail according to claim 36, where in the spacer locating member is located within the enclosed space.

38. The vehicle frame rail according to claim 36, wherein the first half has a first flange and a second flange, the second half has a first flange and a second flange, and wherein the first and second flanges of the second half are located between the first and second flanges of the first half.

39. The vehicle frame rail according to claim 36, wherein the reinforcing member is located between the spacer locating member and the first half.

40. The vehicle frame rail according to claim 36, wherein the hole in the reinforcing member is aligned with the hole in the spacer locating member.

41. A vehicle frame rail, including:
   a first half having a hole;
   a second half having a hole, the second half connected to the first half such that the hole in the first half is aligned with the hole in the second half and so as to form an enclosed space between the first half and the second half;
   a spacer locating member, the spacer locating member having a body section, a support member, and a hole, the body section of the spacer locating member having a planar section, the support member having a first section extending perpendicularly from the planar section and a second section extending parallel to the planar section, and the hole of the spacer locating member located in the planar section;
   a reinforcing member having a hole, the reinforcing member located in the enclosed space such that the hole in the reinforcing member is aligned with the hole in the first half and the hole in the second half; and
   a spacer located in the hole in the reinforcing member, the spacer having a first end, a second end and a bore extending from the first end to the second end, the spacer located in the hole of the spacer locating member such that the bore is aligned with the hole in the first half and the hole in the second half.

42. The vehicle frame rail according to claim 41, where in the spacer locating member is located within the enclosed space.

43. The vehicle frame rail according to claim 41, wherein the first half has a first flange and a second flange, the second half has a first flange and a second flange, and wherein the first and second flanges of the second half are located between the first and second flanges of the first half.

44. The vehicle frame rail according to claim 41, wherein the reinforcing member is located between the spacer locating member and the first half.

45. The vehicle frame rail according to claim 41, wherein the support member is spaced apart from the first half and contacts the second half.

\* \* \* \* \*